United States Patent [19]
Martinez, Jr.

[11] Patent Number: 5,611,071
[45] Date of Patent: Mar. 11, 1997

[54] SPLIT REPLACEMENT CYCLES FOR SECTORED CACHE LINES IN A 64-BIT MICROPROCESSOR INTERFACED TO A 32-BIT BUS ARCHITECTURE

[75] Inventor: Marvin W. Martinez, Jr., Plano, Tex.

[73] Assignee: Cyrix Corporation, Richardson, Tex.

[21] Appl. No.: 425,939

[22] Filed: Apr. 19, 1995

[51] Int. Cl.$^6$ .................................................. G06F 12/08
[52] U.S. Cl. ...................... 395/460; 395/403; 395/470; 395/471; 395/473; 395/496; 395/855; 395/307
[58] Field of Search .................................. 395/307, 403, 395/460, 470, 471, 473, 496, 855

[56] References Cited

U.S. PATENT DOCUMENTS

| | | | |
|---|---|---|---|
| 5,524,235 | 6/1996 | Larson et al. | 395/478 |
| 5,537,536 | 7/1996 | Groves | 395/183.04 |
| 5,555,395 | 9/1996 | Parks | 395/472 |

OTHER PUBLICATIONS stam, Inside Pentium, Magazine, vol. 12, No. 8, p. 123(8).
Seymour, The new standard, PC Magazine, vol. 12, No. 12, p. 108(21).
Case, Pentium extends 486 bus to 64 bits; higher frequencies, new features improve performance, Microprocessor Report, vol. 7, No. 5, p. 10(5).
Bursky, GaAs/CMOS cache chip set powers 66–MHz CPUs, Electronic Design vol. 41, No. 11, p. 43(4).

*Primary Examiner*—Matthew M. Kim
*Attorney, Agent, or Firm*—Andrew S. Viger; John L. Maxin

[57] ABSTRACT

A procedure for implementing cache line replacement cycle as split replacement cycles is used in a 64/32 computer system including a 64-bit x86 microprocessor interfaced to a 32-bit x86 bus architecture which does not support pipelined bus cycles. The microprocessor includes an internal L1 cache with two sectors S0 and S1 per cache line such that a cache line replacement request involving both sectors is performed as a split replacement cycle with a separate burst write cycle for each sector. The microprocessor's bus interface unit (BIU) includes (a) a BCC register which is used to stage the first sector (S0) of a split replacement cycle as the current bus cycle, and (b) a BNC register, which is used in a pipelined 64-bit bus architecture to stage pipelined bus cycles, but is used in the exemplary 64/32 system to stage the second sector (S1) of the split replacement cycle. For normal split replacement cycles, the BIU (a) runs the first burst write cycle to transfer S0 from BCC, (b) transfers the S1 to BCC, and (c) runs the second burst write cycle. If the first burst write cycle is interrupted by BOFF#, and if the cache inquiry hits on S1 in BNC, the BIU implements a combined replacement/snoop write-back cycle with sector reordering by (a) running the snoop write-back cycle to transfer S1 from BNC, and (b) rerunning the first bus cycle to transfer S0 from BCC. Thus, the normal replacement cycle order of S0/S1 is reordered to S1/S0 due to the intervening BOFF# write-back of S1.

20 Claims, 10 Drawing Sheets

SPLIT REPLACEMENT CYCLES FOR SECTORED CACHE LINES IN A 64-BIT MICROPROCESSOR INTERFACED TO A 32-BIT BUS ARCHITECTURE

CROSS REFERENCE TO RELATED APPLICATIONS

This patent is related to the following, commonly assigned U.S. patent applications: (a) Ser. No. 08/563,876, which is a continuation of U.S. patent application Ser. No. 08/425,941, titled "Split Noncacheable Misaligned Reads/Writes In A 64-Bit Microprocessor Interfaced To A 32-Bit Bus Architecture", filed Apr. 19, 1990, now abandoned and (b) Ser. No. 08/425,026, titled "Split Potentially Cacheable Misaligned Reads In A 64-Bit Microprocessor Interfaced To A 32-Bit Bus Architecture", filed Apr. 19, 1995.

BACKGROUND

1. Technical Field

The invention relates generally to computer systems, and more particularly relates to bus interface logic and protocols for interfacing a 64-bit microprocessor to a 32-bit bus architecture. In even greater particularity, the invention relates to bus interface logic and protocols for implementing replacement cycles.

In an exemplary embodiment, the invention permits a 64-bit x86 microprocessor to be used in 486 computer system with a 32-bit x86 bus architecture.

2. Related Art

Microprocessor-based computer systems include a microprocessor, memory subsystem, and system logic, intercoupled by a local (system) bus. The microprocessor includes an internal L1 (level one) cache that together with the memory subsystem—system memory (DRAM) and, often, external L2 (level two) cache—form a memory hierarchy.

The system logic includes a memory/bus controller that together with the microprocessor implements a bus protocol for transferring data between the microprocessor and the external memory subsystem. In addition, the system logic typically supports access to the memory subsystem by external DMA (direct memory access) devices.

Support for DMA accesses to the memory subsystem may require that the bus protocol include a cache coherency (snooping) protocol—the microprocessor snoops the local address bus to detect DMA accesses to addresses that are in the L1 cache. In particular, if the L1 cache uses a write-back design (such that the L1 cache and the memory subsystem are not maintained coherent because CPU writes that hit in the cache are not automatically written through to the memory subsystem), then a snooped DMA address results in a cache inquiry (look-up) and, if the DMA address hits in the L1 cache and contains modified (dirty) data, the microprocessor runs a snoop write-back cycle to update the memory subsystem prior to the DMA access.

Without limiting the scope of the invention, this background information is provided in the context of a specific problem to which the invention has application: designing a 64-bit microprocessor that can be installed in a 32-bit 486-generation microprocessor using a 32-bit 486 bus architecture, including appropriate bus interface and protocol logic.

A 486 computer system is based on the 486 generation microprocessor which is a 32-bit architecture—its internal data paths are 32 bits or one dword (2 words, 4 bytes). A 486 computer system uses a corresponding 32-bit 486 bus architecture in which the local bus is 32 bits.

The 486 microprocessor's L1 cache is organized in a 4 dword (16 byte) cache line. Cacheable data transfers between the microprocessor and the memory subsystem—fills cycles and replacements/snoop write-backs cycles—are run using burst mode bus cycles in which an entire 4 dword cache line is transferred in 4 successive dword transfers.

In accordance with the conventional burst mode bus protocol, for microprocessor-initiated burst mode bus cycles, the microprocessor outputs an address strobe ADS# ("#" indicating an active-low signal) accompanied by an address and bus cycle definition signals—conventional bus cycle definition signals include W/R# (write/read), D/C# (data/control), and M/IO# (memory/IO). In addition, the microprocessor signals BLAST# (burst last) to indicate that the current bus cycle is (a) noncacheable (BLAST# asserted), (b) burst replacement or snoop write-back (BLAST# negated, W/R#=W), or (c) a potentially cacheable read (BLAST# negates, W/R#=R).

For burst mode bus cycles (including potentially cacheable reads for which the microprocessor negates BLAST#), the memory subsystem returns BRDY# when each of the four bus operations transferring a dword is terminated, with the last BRDY# terminating the burst mode bus cycle. In the case of potentially cacheable reads, the system returns KEN# (cache enable) one clock prior to the first BRDY# to indicate a burst transfer—cacheability (cache line fill) is determined by the state of KEN# one clock prior to the final BRDY#.

In addition to the bus cycle control and definition signals, 486 computer systems use bus arbitration signals to support DMA operations: BOFF#, HOLD, and HLDA.

BOFF# (back-off) is asserted by the system logic to force the microprocessor to abort a current bus cycle (burst or non-burst), and relinquish control of the local bus in the next clock cycle—once BOFF# is negated, the microprocessor restarts any aborted bus cycle in its entirety.

HOLD (bus hold request) is asserted by the system logic to indicate that a DMA device requests control of the local bus to run a DMA access to the memory subsystem—the microprocessor will complete a current bus cycle (burst or non-burst) and then acknowledge the request and relinquish control of the local bus.

HLDA (hold acknowledge) is asserted by the microprocessor in response to HOLD (after a current bus cycle is completed) indicating that it has relinquished control of the local bus for a DMA access—when the system logic negates HOLD, the microprocessor negates HLDA.

In addition to the bus cycle control and definition signals, and bus arbitration signals, 486 computer systems use cache coherency signals to support write-back caching on a 486 microprocessor: AHOLD, EADS#, HIT#, HITM#, and INV. A standard MESI (modified, exclusive, shared, invalid) protocol is used.

AHOLD (address hold request) is asserted by the system logic to cause the microprocessor to tristate the address lines of the local bus one clock after AHOLD while completing the current bus cycle (burst or non-burst). A DMA device performs a cache inquiry cycle by driving an address into the microprocessor at the same time it is presented to the memory subsystem—the microprocessor does not initiate another bus cycle except for a snoop write-back cycle resulting from the cache inquiry.

EADS# (external address strobe) is asserted by the system logic to indicate that a valid cache inquiry address is being driven on the address lines—the microprocessor snoops this inquiry address, and asserts HIT# if the inquiry address is in the L1 cache, and also HITM# if the inquiry address dirty (modified state).

HIT# (hit on cache line) is asserted by the microprocessor in response to a cache inquiry cycle if the snooped inquiryaddress is in the L1 cache (modified, elxusive, or shared states)—HIT# is valid two clocks after EADS# is sampled active.

HITM# (hit on modified data) is asserted, along with HIT#, by the microprocessor in response to a cache inquiry cycle if the snooped inquiry address that is in the L1 cache is for a cache line that contains any dirty data (i.e., at least one of the 16 bytes is in the modified state)—a snoop write-back (burst mode) cycle is issued to write the cache line back, updating the external memory substytem inpreparation for the DMA access. HITM# is valid two clocks after EADS# is sampled active, and remains asserted until two clocks after the last BRDY# of the snoop write-back cycle is asserted—while HITM# is asserted, the DMA access is stalled.

INV (invalidate request) is asserted by the system logic to determine the final state of the cache line in the case of a cache inquiry hit in the L1 cache—INV is sampled with EADS#: (a) a logic one directs the microprocessor to change the state of the chache line to invalid, and (b) a logic zero directs the microprocessor to change the state of the cache line to shared.

The x86 microprocessor generations after the 486 (at least the 586 and 686) are 64-bit machines. That is, these 64-bit microprocessors use 64-bit (a qword or two dwords) internal buses and a cache organization with a 4 qword (32 byte) cache line.

Computer systems designed for these 64-bit bit microprocessors use a 64-bit local bus architecture, such as the 586 (or Pentium) bus architecture. Cache line fills, replacements, and snoop write-backs (in response to cache inquiries) are performed in a burst mode transfer of 4 qwords. The basic 586 bus protocols, including bus arbitration and cache coherency, are generally the same as the 486 bus architecture—two differences between the 586 and 486 bus protocols are (a) support for pipeline cycles, and (b) the use of CACHE# instead of BLAST# in signaling cacheability.

Bus pipelining is implemented using an additional bus cycle control signal NA#. NA# (next address) is driven by the system a current bus cycle (BRDY#) to request that the microprocessor drive out address/control for the next pending bus cycle request, designated a pipeline bus cycle. NA# is ignored if there is no pending bus cycle request, or if either the current or next bus cycle is a line replacement or snoop write-back cycle.

Regarding cacheability, the microprocessor signals CACHE# (cache cycle indicator) to indicate that the current bus cycle is a potentially cacheable read, or a cache line replacement or snoop write-back. Specifically, if CACHE# is asserted with W/R#=R, then KEN# is sampled to determine if the bus cycle will be a cache line fill. Assetting CACHE# with W/R#=W indictes a replacemtn or snoop write-back (KEN# ignored). Negating CACHE# for either a read or write indicates a non-burst bus cycle (KEN# is ignored).

It would be advantageous if a newer generation 64-bit microprocessor could be used as an upgrade microprocessor for a conventional 486 computer system. However, a 64/32 bit computer system design presents problems in interfacing a 64-bit x86 microprocessor to a 32-bit x86 bus architecture.

For example, the 64-bit microprocessor's L1 cache with a 32 byte line size must be interfaced to a bus architecture in which a burst mode bus cycle only transfers 4 dwords, or 16 bytes (one-half the microprocessor's cache line). This problem can be alleviated by sectoring the cache—each 32 byte cache line can be logically divided into two 16 byte sectors (both corresponding to a 4 dword cache line). Cache line fills and replacements/snoop write-backs can be performed by two successive burst mode transfers of 16 bytes (one sector) each.

Other problems include implementing (a) BOFF# writeback cycles that interrupt cache line replacements, (b) non-chacheable misaligned reads and writes, and (c) potentially cacheable misaligned reads (i.e., reads for which CACHE# is asserted by the microprocessor, which then tests KEN# to determine cacheability).

Regarding combined replacement and snoop write-back cycles, because BOFF# aborts a current bus cycle but may require a snoop write-back cycle in response to a cache inquiry, if the current bus cycle is a cache line replacement, sectoring the cache line may require swapping the order in which sectors of the cache line being replaced are written back. Specifically, if a two sector cache line replacement S0/S1 is staged to be written back in two successive burst cycles (S0, then S1), the following scenario can arise: (a) BOFF# is asserted during the S0 burst cycle, aborting that burst transfer, (b) inquiry cycle hits on S1 such that HITM# is asserted and an S1 snoop write-back cycle is run, and (c) BOFF# is deasserted, and the S0 burst cycle is restarted. In this scenario, the microprocessor should recognize that the restarted S0 burst transfer completes the cache line (S0/S1) replacement because S1 was previously transferred in the snoop write-back cycle.

Regarding misalignments, the x86 architecture does not require data to be memory aligned—data can be addressed as bytes, words, dwords, or for 64-bit systems, qwords—even though the L1 cache is memory aligned, as are internal and external data transfers. Thus, in the case of the 486 generation microprocessor in which internal data transfers and cache accesses are on the basis of 32-bit aligned dwords, addresses to words (two bytes) are not required to be either dword aligned (i.e., the word may span two aligned dwords), or word aligned (i.e., the word may span the two aligned words of an aligned dword)—in the case of noncacheable transfers, one bus cycle is required to transfer a misaligned word that is dword aligned, while two bus cycles are required to transfer a word (or dword) that is dword misaligned.

In the case of a 64-bit microprocessor, cache accesses and internal and external transfers are qword aligned—a misaligned word or dword may be qword aligned, such that a single bus cycle request will access the data, or qword misaligned, such that two qword bus cycles are required. If the 64-bit microprocessor is interfaced to a 32-bit bus architecture, a qword bus cycle request must be converted into two 32-bit (dword) bus cycles—if a word or dword is qword aligned but dword misaligned, then both dwords of the qword must be transferred in successive transfers.

So, in the case of noncacheable misaligned reads and writes, a misaligned word or dword that is qword aligned (which in a 64-bit system would be transferred by transferring the qword) must be converted to two dword bus cycles.

And, in the case of potentially cacheable misaligned reads, the 64-bit microprocessor will initiate a potentially cacheable read cycle by providing a word or dword address that, due to dword misalignment, will be staged as two dword bus cycles. In the first bus cycle, the bus interface unit will drive out the first dword address (along with the appropriate bus cycle definition signals), and will assert CACHE#, indicating that the read is potentially cacheable. If KEN# is returned, signaling a cacheable burst read cycle, the bus interface unit must recognize that the second dword will be transferred as part of the burst, and invalidate the staged bus cycle for the second dword.

SUMMARY

An object of the invention is to provide a 64-bit microprocessor design with bus interface and protocol logic for interfacing to a 32-bit bus architecture, including implementing replacement cycles involving both sectors of a cache line. Another object of the invention is to implement combined replacement/snoop write-back cycles including sector reordering.

These and other objects of the invention are achieved by a 64/32 computer system including a 64-bit x86 microprocessor, system logic, and system memory, intercoupled by a 32-bit x86 bus architecture which does not support pipelined bus cycles. The microprocessor includes an internal L1 cache with two sectors per cache line such that a cache line replacement request involving both sectors is performed as a split replacement cycle with a separate burst write cycle for each sector.

In one aspect of the invention, a bus interface unit (BIU) in the microprocessor is interfaced to the 32-bit bus architecture to implement bus cycles in response to bus cycle requests—the BIU is adaptable to interfacing to a 64-bit bus architecture that supports piplined bus cycles. The BIU includes (a) BCC logic for staging a current bus cycle, and (b) BNC logic for staging a piplined bus cycle in applications with a 64 bit bus architecture.

In response to a cache line replacement request in which both sectors of a cache line will be written back to the system memory (such as where both sectors contain modified data), the BIU implements a split replacement cycle by (a) staging a first sector in the BCC logic, and (b) staging a second sector in the BNC logic. With the split replacement cycle staged in the BCC/BNC logic, the BIU then (a) runs a first burst write cycle to transfer the first sector staged in the BCC logic, and then (b) runs a second burst write cycle to transfer the second sector staged in the BNC logic.

In another aspect of the invention, the BCC logic includes a BCC register that stores bus cycle address and attributes including a valid indication, and the BNC logic includes a BNC register that stores bus cycle address and attributes including a valid indication. The BIU stages the split replacement cycle by (a) storing address and attributes for the first sector in the BCC register, designating that register as valid, and (b) storing address and attributes for the second sector in the BNC register, designating that register as valid. The BIU then runs the split replacement cycle by (i) running the first burst write cycle to transfer the first sector staged in the BCC register, (ii) transferring the address and attributes for the second sector from the BNC register to the BCC register, and designating the BNC register as invalid, and then (iii) running the second burst write cycle to transfer the second sector staged in the BCC register.

In another aspect of the invention, the BCC register stores a request done attribute that, when asserted, indicates that when the current bus cycle completes, the BIU can signal that an associated bus cycle request is done. When the BIU stages a split replacement cycle, the request done attribute is cleared when address and attributes for the first sector are stored in the BCC register, and then after the first burst write cycle transfers the first sector, and address and attributes for the second sector are transferred to the BCC register, the request done attribute is asserted.

In another aspect of the invention, the BIU implements sector reordering when a split replacement cycle is interrupted by a BOFF# write-back of the second sector staged in the BNC logic. That is, sector reordering is required if BOFF# is asserted during the first burst write cycle of the split replacement cycle, and if the cache inquiry hits on the second sector staged in the BNC logic for the second burst write cycle of the split replacement cycle, such that a snoop write-back cycle is run to transfer such second sector. After the snoop write-back cycle, the BIU restarts the first burst write cycle to transfer the first sector staged in the BCC logic, and after the burst write cycle transferring the first sector is complete, the BIU signals that the cache line replacement request is done.

Embodiments of the invention may be implemented to realize one or more of the following technical advantages. In a 64 bit microprocessor, logic used to support pipelining in a 64-bit bus architecture is used in interfacing to a 32-bit bus architecture including implementing the following bus cycle requests as split bus cycles: (a) replacement cycles involving both sectors of a cache line, (b) noncacheable misaligned reads/writes, and (c) potentially cacheable misaligned reads. Regarding split replacement cycles, the microprocessor supports sector reordering when the replacement cycle is interrupted by a BOFF# write-back of one of the sectors. Regarding the split potentially cacheable misaligned reads, the microprocessor invalidates the second bus cycle of the misaligned read if the first bus cycle is converted into a burst fill cycle. To interface the 64-bit microprocessor to a non-pipelined 32-bit bus architecture, the BIU is designed to use pipelining logic, including a next (pipeline) cycle register, which is included to support a pipelined 64-bit bus architecture, to stage split bus cycle requests in which a single bus cycle request from the microprocessor's L1 cache is split by the BIU into two separate bus cycles, with the second bus cycle being staged in the next (pipeline) cycle register.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DRAWINGS

DETAILED DESCRIPTION

Figure 1A:
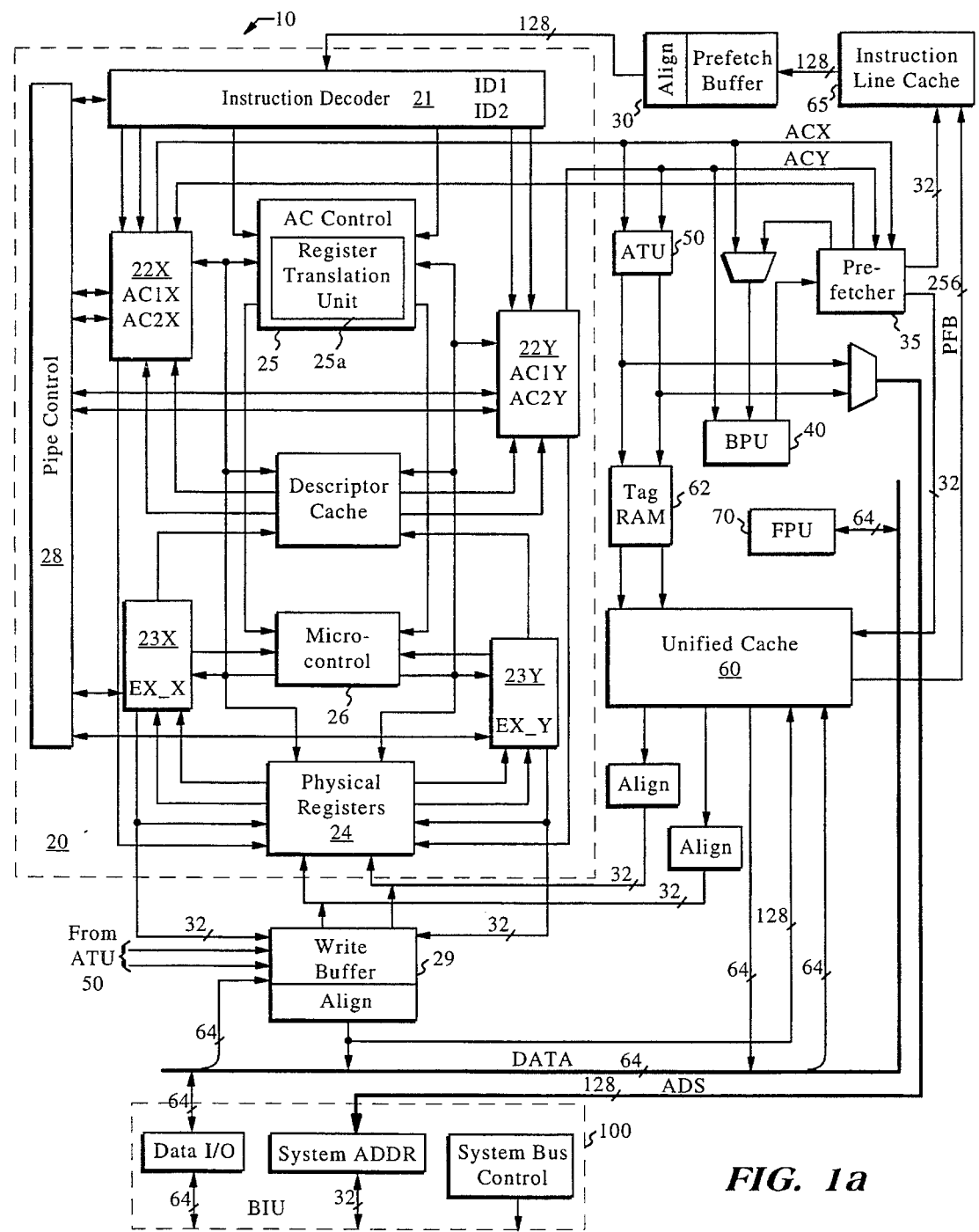
FIG. 1a is a general block diagram of the exemplary 64-bit microprocessor.

The detailed description of an exemplary embodiment of a 64-bit x86 microprocessor design that interfaces to a 32-bit x86 bus architecture, including implementing split bus cycles for cache line replacements involving both sectors of a cache line (with sector reordering if the replacement cycle is interrupted by a BOFF# write-back of one of the sectors, is organized as follows:

1. Exemplary Processor System
   1.1. Microprocessor
   1.2. System
2. Sectored Cache
3. Bus Interface Unit
   3.1. BCC/BNC/BHM Registers
   3.2. Bus Cycle Requests
   3.3. Pipeline Cycles
   3.4. Cache Inquiry Cycles
4. Replacement/Snoop Write-Back
   4.1. BNC Staging
   4.2. Protocol
5. Misaligned Read/Writes
   5.1. BNC Staging
   5.2. Protocol
6. Potentially Cacheable Misaligned Reads
   6.1. BNC Staging
   6.2. Protocol
7. Conclusion This organizational outline, and the corresponding headings, are used in this Detailed Description for convenience of reference only.

The exemplary microprocessor design is implemented in a 64/32 computer system with a 64-bit x86 microprocessor interfaced to a 32-bit 486 bus architecture, supporting a 486 bus protocol including bus arbitration and cache coherency control (but not bus pipelining as used in a conventional 64-bit 586 or Pentium bus architecture).

Detailed descriptions of conventional or known aspects of microprocessor systems are omitted so as to not obscure the description of the invention. In particular, terminology specific to the x86 microprocessor architecture, and the associated 486 and 586 bus architectures, (such as register names, signal nomenclature, addressing modes, pinout definition, etc.) is known to practitioners in the microprocessor field, as is the basic design and operation of such microprocessors and of computer systems based on them. In addition, those skilled in the art are familiar with the bus cycle protocols used with the conventional 486 and 586 bus architectures, including addressing and bus cycle control, burst and non-burst mode transfers, pipelining (586 only), and bus arbitration/cache coherency.

A 64/32 system (or mode) refers to a computer system with a 64-bit microprocessor and a 32-bit bus architecture, while a 64-bit or 32-bit system (or mode) refers to a computer system where the microprocessor and the bus architecture are both respectively 64 or 32-bit.

When used with a signal, the # symbol designates a signal that is active low, while the / symbol designates the complement of a signal.

1. Exemplary Processor System

Figure 1B:
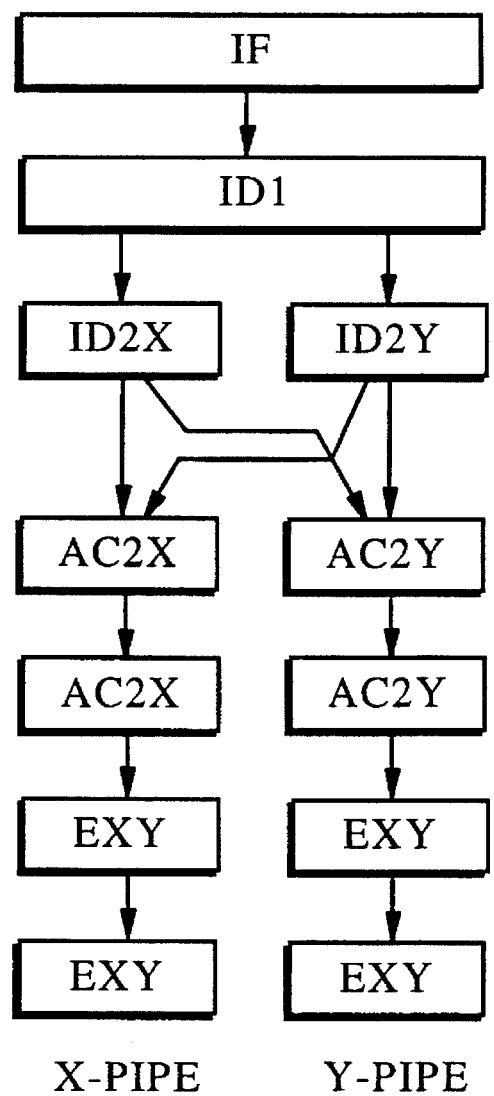
FIG. 1b illustrates the stages of an instruction pipeline.
Figure 2:
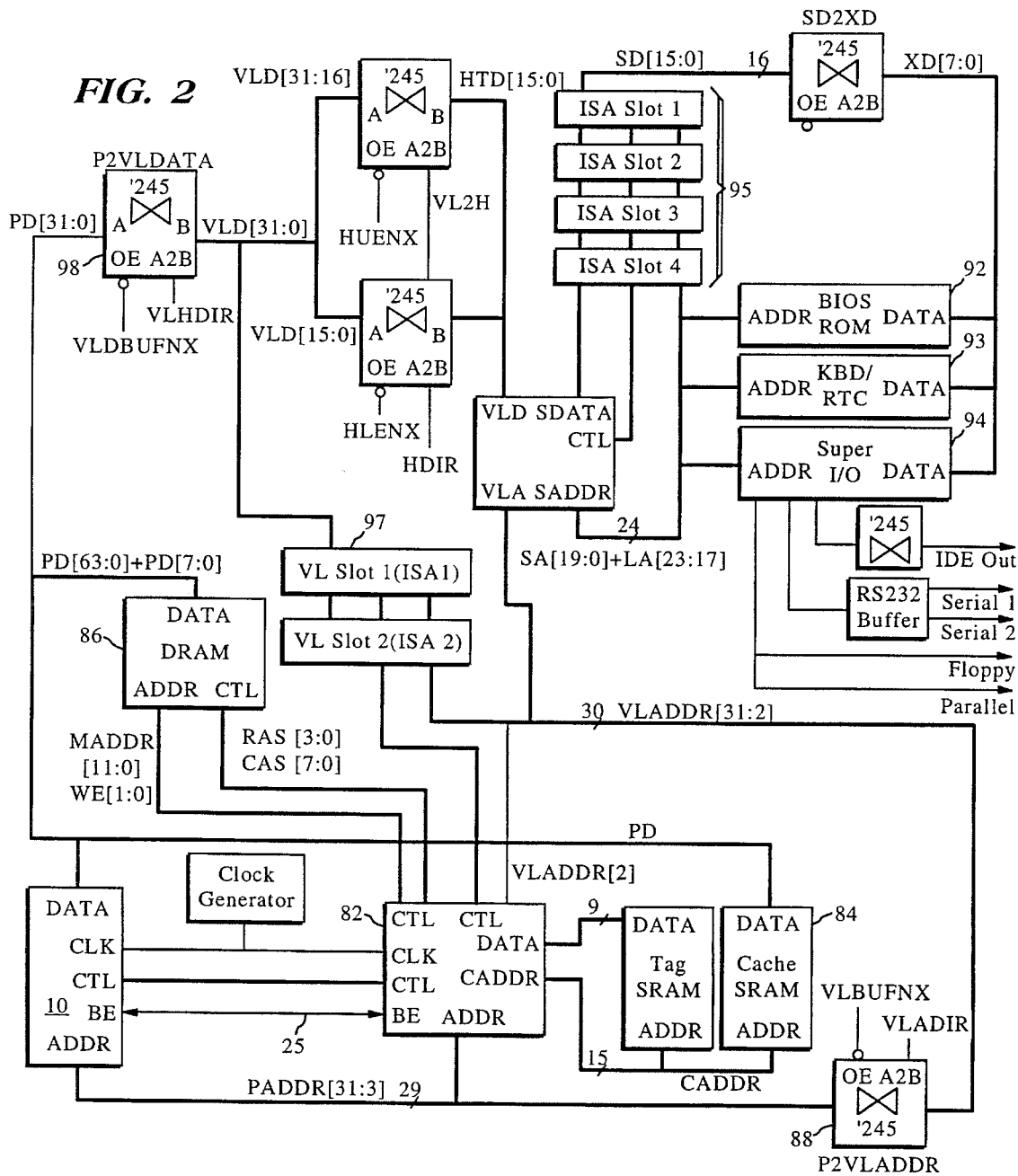
FIG. 2 illustrates an exemplary computer system including a microprocessor, a memory/bus controller, and a memory subsystem including L2 cache and system DRAM.

The exemplary processor system is shown in FIGS. 1a and 1b, and FIG. 2. FIGS. 1a and 1b respectively illustrate the basic functional blocks of the exemplary superscalar, superpipelined microprocessor along with the pipe stages of the two execution pipelines. FIG. 2 illustrates an exemplary processor system (motherboard) design using the microprocessor.

1.1. Microprocessor

Referring to FIG. 1a, the major sub-blocks of a microprocessor 10 include: (a) CPU core 20, (b) prefetch buffer 30, (c) prefetcher 35, (d) BPU (branch processing unit) 40, (e) ATU (Address Translation Unit) 50, and (f) unified 16 Kbyte code/data cache 60, including TAG RAM 62. A 256 byte instruction line cache 65 provides a primary instruction cache to reduce instruction fetches to the unified cache, which operates as a secondary instruction cache. An onboard floating point unit (FPU) 70 executes floating point instructions issued to it by the CPU core 20.

The microprocessor uses internal 32-bit address and 64-bit data-buses ADS and DATA. A 256 bit (32 byte) prefetch bus PFB, corresponding to the 32 byte line size of the unified cache 60 and the instruction line cache 65, allows a full line of 32 instruction bytes to be transferred to the instruction line cache in a single clock. Interface to external 32 bit address and 64 bit data buses is through a bus interface unit BIU 100.

The CPU core 20 is a superscalar design with two execution pipes X and Y. It includes an instruction decoder 21, address calculation units 22X and 22Y, execution units 23X and 23Y, and a register file 24 with 32 32-bit registers. An AC control unit 25 includes a register translation unit 25a with a register scoreboard and register renaming hardware. A microcontrol unit 26, including a microsequencer and microrom, provides execution control.

Writes from CPU core 20 are queued into twelve 32 bit write buffers 29—write buffer allocation is performed by the AC control unit 25. These write buffers provide an interface for writes to the unified cache—noncacheable writes go directly from the write buffers to external memory. The write buffer logic supports optional read sourcing and write gathering.

A pipe control unit 28 controls instruction flow through the execution pipes, including keeping the instructions in order until it is determined that an instruction will not cause an exception, squashing bubbles in the instruction stream, and flushing the execution pipes behind branches that are mispredicted and instructions that cause exceptions. For each stage, the pipe control unit keeps track of which execution pipe contains the earliest instruction, and provides a stall output and receives a delay input.

BPU 40 predicts the direction of branches (taken or not taken), and provides target addresses for predicted taken branches and unconditional change of flow instructions (jumps, calls, returns). In addition, it monitors speculative execution in the case of branches and floating point instructions, i.e., the execution of instructions speculatively issued after branches which may be resolved as mispredicted, and floating point instructions issued to the FPU which may fault after the speculatively issued instructions have completed execution. If a floating point instruction faults, or if a branch is mispredicted (which will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the processor state at each pipe stage as a floating point or predicted branch instruction enters that stage. For these checkpointed instructions, all resources (programmer visible registers, instruction pointer, condition code register) that can be modified by succeeding with speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or the floating point instruction does not fault).

The unified cache 60 is 4-way set associative (with a 4 k set size), using a pseudo-LRU replacement algorithm, with write-through and write-back modes. It is dual ported (through banking) to permit two memory accesses (data read, instruction fetch, or data write) per clock. The instruction line cache is a fully associative, lookaside implementation (relative to the unified cache), using an LRU replacement algorithm.

The FPU 70 includes a load/store stage with 4-deep load and store queues, a conversion stage (32-bit to 80-bit extended format), and an execution stage. Loads are controlled by the CPU core 20, and cacheable stores are directed through the write buffers 29 (i.e., a write buffer is allocated for each floating point store operation).

Referring to FIG. 1*b*, the microprocessor has seven-stage X and Y execution pipelines: instruction fetch IF, two instruction decode stages ID1 and ID2, two address calculation stages AC1 and AC2, execution EX, and write-back WB. Note that the complex instruction decode ID and address calculation AC pipe stages are superpipelined.

The IF stage provides a continuous code stream into the CPU core 20. The prefetcher 35 fetches 16 bytes of instruction data into the prefetch buffer 30 from either the (primary) instruction line cache 65 or the (secondary) unified cache 60. BPU 40 is accessed with the prefetch address, and supplies target addresses to the prefetcher for predicted changes of flow, allowing the prefetcher to shift to a new code stream in one clock.

The decode stages ID1 and ID2 decode the variable length X86 instruction set. The instruction decoder 21 retrieves 16 bytes of instruction data from the prefetch buffer 30 each clock. In ID1, the length of two instructions is decoded (one each for the X and Y execution pipes) to obtain the X and Y instruction pointers—a corresponding X and Y bytes-used signal is sent back to the prefetch buffer (which then increments for the next 16 byte transfer). Also in ID1, certain instruction types are identified, such as changes of flow, and immediate and/or displacement operands are separated. The ID2 stage generates completes decoding the X and Y instructions, generating entry points for the microrom and decoding addressing modes and register fields.

During the ID stages, the optimum pipe for executing an instruction is determined, and the instruction is issued into that pipe. Pipe switching allows instructions to be switched from ID2X to AC1Y, and from ID2Y to AC1X. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control debug, test), Multiply/Divide, Input/Output, PUSHA/POPA (PUSH all/POP all), and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). Data dependencies are also checked and resolved using the register translation unit 25*a* (including register renaming hardware)—the 32 physical registers 24 are used to map the 8 general purpose programmer visible logical registers defined in the X86 architecture (EAX, EBX, ECX, EDX, EDI, ESI, EBP, ESP).

The AC unit includes 8 architectural (logical) registers (representing the X86 defined register set) that are used by the AC unit to avoid the delay required to access in AC1 the register translation unit before accessing register operands for address calculation. For instructions that require address calculations, AC1 waits until the required data in the architectural registers is valid (no read after write dependencies) before accessing those registers. During the AC2 stage, source operands are obtained by accessing the register file 26 and the unified cache 60 with the physical address (for cache hits, cache access time for the dual ported unified cache is the same as that of a register, effectively extending the register set)—the physical address is either the linear address, or if address translation is enabled, a translated address generated by the ATU 50.

Translated addresses are generated by the ATU 50 (using a TLB or translation lookaside buffer) TLB from the linear address using information from page tables in memory and workspace control registers on chip. The unified cache is virtually indexed and physically tagged to permit, when address translation is enabled, set selection with the untranslated address (available at the end of AC1) and, for each set, tag comparison with the translated address from the ATU (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order (i.e., maintaining precise exceptions) is ensured.

The execution stages EXX and EXY perform the operations defined by the instruction. Instructions spend a variable number of clocks in EX, i.e., they are allowed to execute out of order (out of order completion). Both EX stages include adder, logical, and shifter functional units, and in addition, the EXX stage contains multiply/divide hardware.

The write back stage WB updates the register file 24, condition codes, and other parts of the machine state with the results of the previously executed instruction. The register file is written in PH1 (phase 1) of WB, and read in PH2 (phase 2) of AC2.

FIG. 1c illustrates a flow of eight instructions through the X and Y pipelines, idealized to illustrate the major advantage of pipelining—increasing the number of instructions completed per clock without reducing the execution time of an individual instruction. As shown, no stage requires more than one internal clock cycle (2X the external clock)—in actual operation, one or more stages may require additional clock cycles to complete, thereby changing the flow of instructions through the other pipe stages. Moreover, the flow of instructions through one pipeline may be dependent upon the flow of instructions through the other pipeline.

1.2. Processor System

Referring to FIG. 2, for the exemplary embodiment, microprocessor 10 is used in a processor system that includes a single chip memory and bus controller 82. The memory/bus controller 82 provides the interface between the microprocessor and the external memory subsystem—level two cache 84 and main memory 86—controlling data movement over the 64 bit processor data bus PD (the data path is external to the controller which reduces its pin count and cost).

Controller 82 interfaces directly to the 32-bit address bus PADDR, and includes a one bit wide data port (not shown) for reading and writing registers within the controller. A bidirectional isolation buffer 88 provides an address interface between microprocessor 10 and VL and ISA buses.

Controller 82 provides control for the VL and ISA bus interface. A VL/ISA interface chip 91 (such as an HT321) provides standard interfaces to a 32-bit VL bus and a 16 bit ISA bus. The ISA bus interfaces to BIOS 92, keyboard controller 93, and I/O chip 94, as well as standard ISA slots 95. The interface chip 91 interfaces to the 32 bit VL bus through a bidirectional 32/16 multiplexer 96 formed by dual high/low word [31:16]/[15:0] isolation buffers. The VL bus interfaces to standard VL slots 97, and through a bidirectional isolation buffer 98 to the low double word [31:0] of the 64 bit processor data bus PD.

2. Sectored Cache

The exemplary design of the 64-bit microprocessor includes a cache organization that supports interfacing to a 32-bit 486 bus architecture. Specifically, the cache is sectored to accommodate splitting cache line transfers (fills, replacements, snoop write-interface backs) into two 4 dword burst transfers rather than the normal single 4 qword burst transfer for 64-bit systems.

Figure 3A:
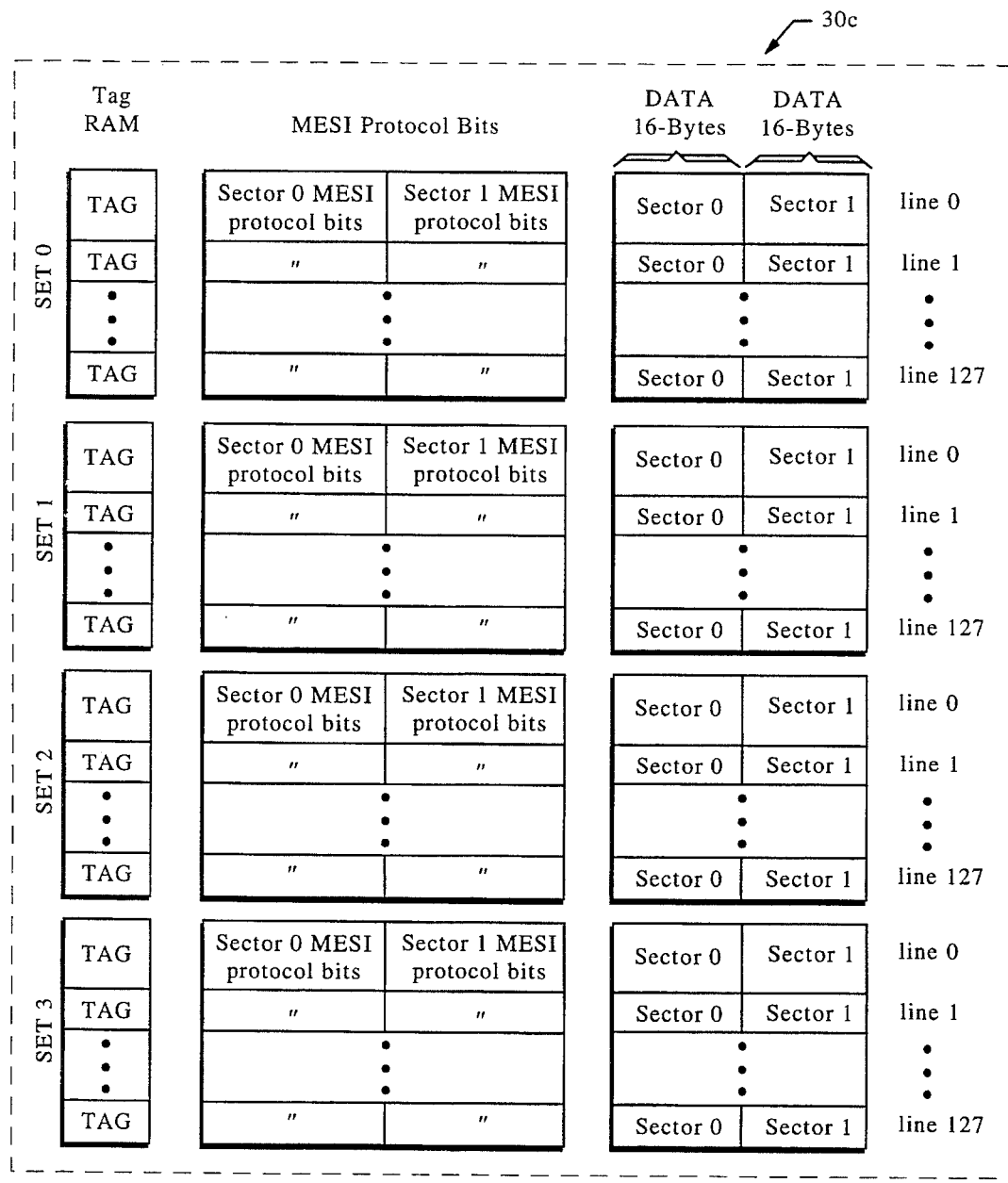
FIG. 3a is a block diagram illustrating an exemplary organization for the microprocessor's L1 cache memory in which each 32 byte (4 qword) cache line is segmented into two sectors each with 16 bytes (4 dwords) such that a cache line fill or replacement/snoop write-back requires staging the cache line for two successive burst mode bus cycles each transferring one sector.

FIG. 3a illustrates an exemplary organization for the L1 cache (60 in FIG. 1a) to provide for sectored cache line transfers. The L1 cache is 4-way set associative (Sets 0–3), each set having 128 cache lines, each with 32 bytes or 4 qwords.

Each 32 byte cache line is segmented into two sectors S0 and S1, each with 16 bytes or 4 dwords. This sectoring of the L1 cache permits cache line transfers to be split into two separate burst mode bus cycles transferring one-half of the 32 byte cache line each. Note that the addresses for S0 and S1 differ in address bit A4—for S0, A4=0, and for S1 A4=1.

Thus, for a 64/32 system, the exemplary L1 cache submits fill cycle requests on a sector basis, which the BIU (100 in FIG. 1a) implements as a burst fill cycle to transfer the 4 dwords of the cache line. Snoop write-back cycles, which are initiated by the BIU in response to a cache inquiry, are also performed on a sector basis—if the cache inquiry hits on a modified sector in the L1 cache, that sector will be invalidated and a snoop write-back cycle run by the BIU.

In contrast, replacement cycle requests by the L1 cache are always submitted on a cache line basis because the exemplary cache is tagged by cache line not sector. The BIU converts the request into either one or two burst mode write cycles, depending on the state of the MESI bits for each sector—specifically, to limit bus traffic, the replacement causes a burst write cycle only for those sectors that contain modified (dirty) data.

In accordance with aspects of the invention, for interfacing to a 32-bit bus architecture, the exemplary bus interface unit implements the staging operations necessary to convert a 4 qword cache line transfer (S0 and S1) into one or two transfers of a sector of 4 dwords (see, Sections 3 and 4).

The cache TAG RAM (62 in FIG. 1a) has a tag for each cache line. Each sector of a cache line has a set of MESI protocol bits (modified or "dirty", exclusive, shared, invalid). Tagging each cache line rather than each sector reduces the size of the TAG RAM, but necessitates that replacements invalidate both sectors of the cache line replaced—the BIU will write back one or both of the sectors depending on the state of the sector MESI bits.

A CPU access to the cache results in a tag comparison using address bits A[31-5] designating a cache line. In the case of a hit, address bit A[4] determines the sector, and the respective MESI bits determine the status of the sector. Address bit A[4] together with the byte enables (A[3-0]) are used to detect a sector misalignment—if A[4]=1, only sector S1 is involved in the access, while if A[4]=0, the byte enables are used to determine whether the access involves S0 (sector aligned), or both S0/S1 (sector misalignment). Thus, either S0, S1, and both S0/S1 may be valid—in contrast, for 64-bit mode, both sectors are either valid or invalid.

For 64/32 mode, a CPU read access may miss because (a) there is no tag match (i.e., the entire line is not in the cache), or (b) the tag matches, but the relevant sector (S0 or S1) is invalid. The L1 cache logic signals a potentially cacheable read cycle request to the BIU, which runs a read cycle with BLAST# negated—if KEN# is returned such that the read cycle request is converted into a sector fill cycle, the transferred sector is supplied to the L1 cache logic, which fills the appropriate sector in the cache. Filling by sector rather than cache line is a design choice to improve performance under certain conditions.

The exemplary L1 cache logic includes logic that detects when a read access to the cache is sector misaligned but cache line aligned. In 64-bit mode, if a potentially cacheable read cycle does not result in a cache line fill cycle, the L1 cache logic will request a second read cycle for the other sector of the line (which contains the rest of the sector misaligned data). In 64/32 mode, the L1 cache logic will automatically schedule two successive read cycles for both sectors containing the misaligned data.

Figure 3B:
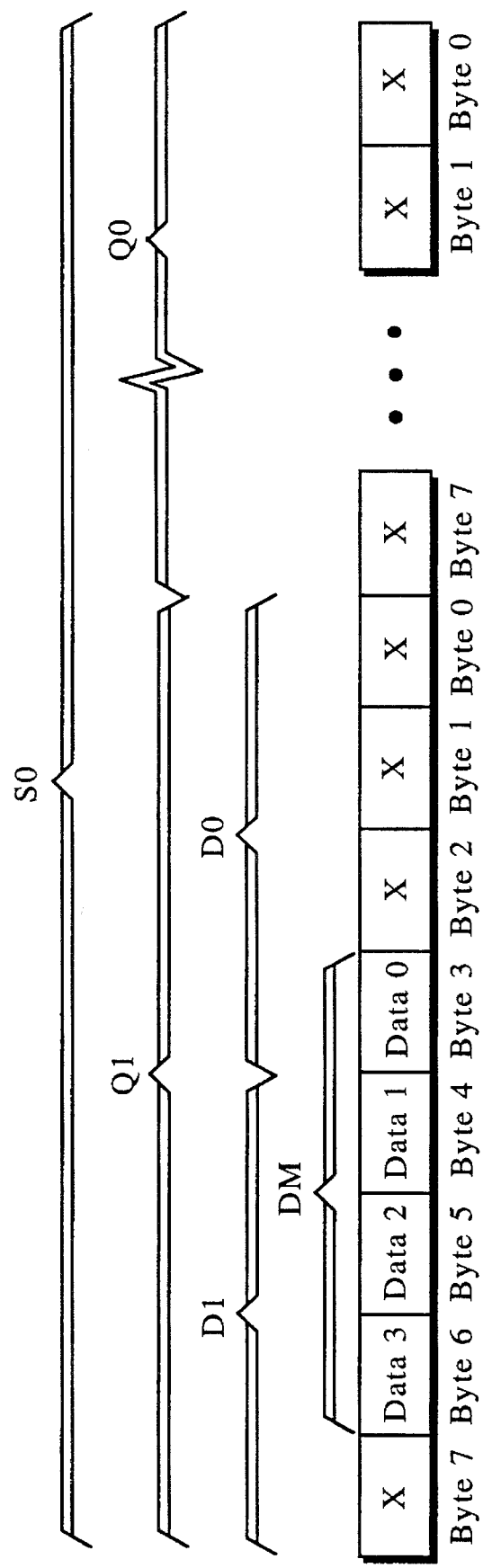
FIG. 3b illustrates a qword in which a dword is dword misaligned but qword aligned.

FIG. 3b illustrates a sector S0 containing two memory aligned qwords Q0 and Q1. Each qword contains two aligned dwords—qword Q0 contains dwords D0 (bytes 0–3) and D1 (bytes 4–7). The address for any data in the memory aligned qword (byte, word, dword, or qword) is the address of the qword A[31-3], with the byte enables BE[7:0] (which are decoded from address bits A2–A0) identifying the valid bytes of data within the qword, including identifying dwords D0 and D1.

For a bus cycle request, the L1 cache logic signals a qword address A[31-3] (along with address bit A[2]) and associated byte enables BE[7:0]—that is, the L1 cache logic supplies to the BIU the address bits for a 32-bit dword A[31-2], and the byte enables for a 64-bit qword. For a 64-bit system, the BIU ignores the A[2] address bit, while for a 64-32 system, the BIU converts the 8 byte enables into 4 byte enables BE[3:0] used for the conventional 486 bus architecture.

From the Background, the 64-bit microprocessor is able to address bytes, words, or dwords, as well as qwords. All bus cycle requests are qword aligned, although the addressed words or dwords that cause the request need not be either qword or dword aligned.

In particular, a misaligned dword may be qword misaligned or aligned. If a misaligned dword is also qword misaligned, two (qword) bus cycles will be requested—one for each qword containing the addressed data. If, however, the misaligned dword is qword aligned, it will be retrieved in a single qword bus cycle. FIG. 3a illustrates a misaligned dword DM that is qword aligned Q0—the four bytes of the misaligned dword are bytes 3–6 of the qword (as identified by the byte enables).

In issuing a bus cycle request to the BIU for a dword (cacheable or noncacheable), the exemplary L1 cache logic detects when a dword (or word) address includes bytes 3 and 4 of a qword, and signals misalignment to the BIU. As a consequence, for 64/32 mode operation, the BIU is not required to detect dword (or word) misalignment by decoding the byte enables.

For the exemplary 64/32 system with a 32-bit bus architecture, each bus cycle request for a qword will be converted into two dword bus cycles. A bus cycle request for a dword that is qword aligned will be either: (a) if the dword is dword aligned, converted by the BIU into a single bus cycle to transfer the aligned dword (e.g., D0 in FIG. 3b), or (b) if the dword is dword misaligned, converted by the BIU into a split bus cycle request implemented by two dword bus cycles to transfer both dwords containing data in the dword (e.g., DM in FIG. 3a). See, Sections 5 and 6.

In summary, interfacing a 64-bit microprocessor to a 32-bit bus architecture results in a single bus cycle request being converted into two separate bus cycles in the following situations (a) cache line replacements, and (b) read/write cycles for misaligned data (words/dwords) that are qword aligned.

3. Bus Interface Unit

The 64-bit microprocessor design includes exemplary bus interface and protocol logic for interfacing to a conventional 32-bit 486 bus architecture. In particular, according to aspects of the invention, the bus interface unit uses pipelining logic (i.e., logic that supports pipeline cycles in a 64-bit bus architecture) for staging split bus cycles: (a) split replacement cycles involving both sectors of a cache line (see, Section 4), (b) split noncacheable misaligned reads/writes (see, Section 5), and (c) split potentially cacheable misaligned reads (split, Section 6). Moreover, in the case of split replacement cycles, the BIU implements sector reordering for replacement cycles interrupted by a BOFF# write-back cycle, and in the case of split potentially cacheable reads, the BIU invalidates the second bus cycle if the first bus cycle is converted to a burst fill cycle).

Figure 4A:
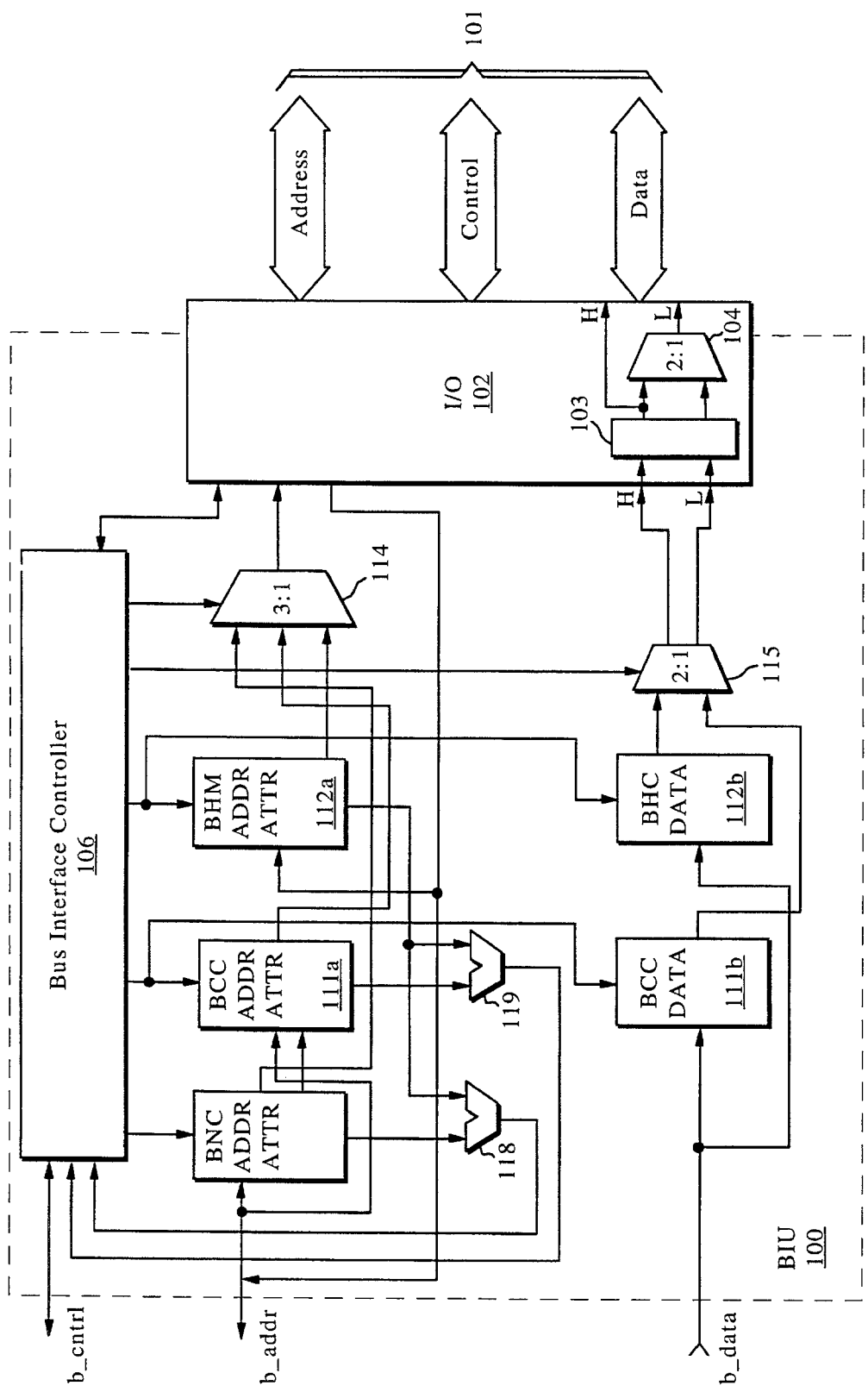
FIG. 4a illustrates the exemplary bus interface unit (BIU) for the microprocessor, including the bus cycle address registers BCC, BNC, and BHM used conventionally in a 64-bit system respectively for current bus cycles, next or "pipelined" bus cycles, and inquiry cycles.

FIG. 4a illustrates the exemplary bus interface unit (BIU) 100 for the microprocessor. The description of the BIU in this Section 3 will cover the general design for use in a 64-bit system, pointing out the architectural features added to implements aspects of the invention.

The BIU interfaces the microprocessor to the external local (system) bus 101 (see, FIG. 2, PADDR, Cntrl, and PD), through I/O circuitry 102. The BIU is coupled to the L1 cache logic (and write buffers) by three internal buses: b_addr, b_cntrl, and b_data.

The I/O circuitry includes input and output address and data latches—only output data latches 103 are shown—which are used during bus cycles to stage address and data at the I/O pins. These address and data latches are transparent, permitting address and data to be updated and driven out in ph1 of the same clock.

When coupled to a 32-bit bus architecture, the 64-bit output data latches 103 are multiplexed onto the 32-bit external data bus by 2:1 multiplexer 104. The data output latches include both high H and low L dword sections. The high dword from the data output latches is coupled (a) for 64-bit mode, to the upper 32 bits of the 64-bit local data bus, and (b) for 64/32 mode, to one input of the multiplexer 104. When interfacing to a 32-bit local data bus, the multiplexer 104 selects either the high or low dword for output from the output data latches 103 to the 32 bits of the local data bus (corresponding to the low 32 bits of a 64-bit bus)—the selection is based on the address bit A2. The interface for the data input latches (not shown) is analogous.

Control for the BIU is provided by a bus interface controller 106. In particular, the controller 106 implements logic (a) for counting BRDY#s, and detecting the last BRDY# of a 4-beat burst (64 or 64/32 mode), and (b) for implementing CACHE# for 64-bit bus architectures, and BLAST# for 32-bit bus architectures

3.1. BCC/BNC/BHM Registers

The BIU includes three bus cycles registers: current bus cycle register BCC, next or "pipeline" bus cycle register BNC, and cache inquiry cycle register BHM.

For a 64-bit system, these bus cycle registers provide an address/control/data interface for a 64-bit 586 bus architecture. In particular, the BCC and BNC are used to support conventional 586 bus pipelining—BCC holds address/control/data for the current bus cycle, while BNC holds address/control for the next pending bus cycle (assuming that the next pending bus cycle can be pipelined) which will be driven out in response to NA# from the system.

The cache inquiry cycle register BHM holds address/control/data for a cache inquiry bus cycle. During BOFF# or AHOLD, the DMA device drives address/control into the microprocessor which is captured in BHM as a cache inquiry—if a snoop write-back cycle is required, the appropriate data is input to BHM and the write-back cycle run to update memory.

The current cycle register BCC and inquiry cycle register BHM each comprise two register sections, one for address/attributes, and one for data. Thus, BCC includes an ADDR/ATTR section 111a and a DATA section 111b, while BHM includes ADDR/ATTR section 112a and DATA section 112b.

The next (pipeline) cycle register BNC is only required to hold address/attribute information. For the exemplary BIU design, the BNC is not used to run bus cycles, but rather, is used to stage address/control to support conventional pipelining for a 586 bus architecture.

In accordance with aspects of the invention, the BNC pipeline register, and associated pipelining logic, are used in 64/32 mode to implement in the BIU converting bus cycle requests into two separate bus cycles, i.e., (a) cache line replacements, and (b) read/write cycles for misaligned data (words/dwords) that are qword aligned. See, Sections 4, 5, and 6.

Figure 4B:
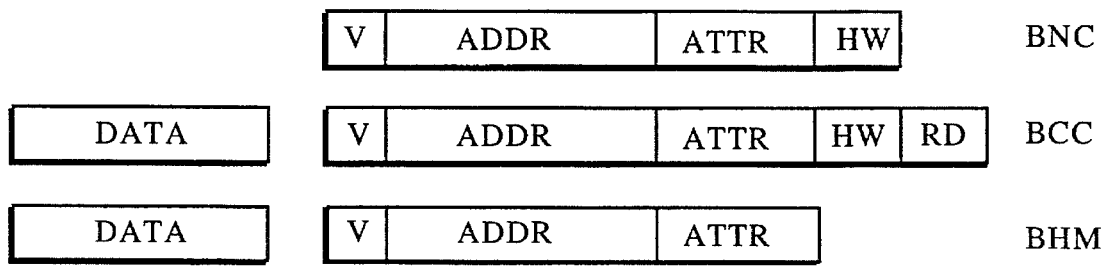
FIG. 4b illustrates the bit fields contained in the current cycle BCC (attribute/address/data) register, the pipeline cycle BNC (attribute/address) register, and the inquiry cycle BHM (attribute/address/data) register.

FIG. 4b illustrates the bit fields contained in the current cycle register BCC, next cycle register BNC, and inquiry cycle register BHM. The BCC and BHM registers each include (a) address and attribute fields, as well as a valid bit, and (b) a 64-bit data field that stages one aligned qword. The BNC register includes address and attribute fields, as well as a valid bit field.

The attribute fields include bus cycle control information, and selected MESI bits, used in the cache inquiry procedure (see, Section 3.3). The attribute fields both the BCC and BNC registers also include a has_write bit HW, while the attribute field of BCC includes a bus request done bit RD.

For the exemplary BIU, the has_write bit is used conventionally to signify that, for writes, the BCC has received a qword of data from the L1 cache logic (into the DATA section 111b in FIG. 4a)—when has_write is asserted after the data is staged into BCC, the L1 cache logic need not continue to stage the data because, if BOFF# is asserted during the bus cycle, the BIU can restart the bus cycle with the data already staged in BCC. Has_write is clear (0) if the current bus cycle is a write but data is not yet staged in BCC, and is asserted (1) if the current bus cycle is a read, or a write in which the data is currently staged in BCC.

In accordance with aspects of the invention, has-write is used to implement (a) noncacheable (non-burst) read/write cycles for misaligned data (words or dwords) that are qword aligned, and (b) potentially cacheable reads of a misaligned data (words or dwords) that are qword aligned (see, Sections 5 and 6).

In accordance with aspects of the invention, the bus request done attribute bit RD in the current cycle register BCC is used to identify bus cycle requests that are split into two separate bus cycles, such that address/control for the first bus cycle is loaded into BCC, and address/control for the second bus cycle is loaded into the next (pipeline) cycle register BNC. Such split bus cycle requests occur in the following situations: (a) cache line replacements (see, Section 4), (b) noncacheable (non-burst) read/write cycles for misaligned data (words/dwords) that are qword aligned (see, Section 5), and (c) potentially cacheable reads of misaligned data (words/dwords) that are qword aligned (see, Section 6).

In the case of a split bus cycle request, the BIU does not notify the L1 cache logic that a bus cycle request is done until after the second bus cycle is completed (or obviated). The BCC request done bit RD is cleared when the BIU loads a split bus cycle request as two separate bus cycles into BCC and BNC—RD is switched to asserted when BNC is invalidated such that either (a) the current bus cycle is the second bus cycle of a split bus cycle request, or (b) the second bus cycle has been obviated. The latter case can occur for a split replacement cycle where one sector is transferred in an intervening snoop write-back back cycle obviating the second bus cycle of the replacement cycle (see, Section 4), or where a potentially cacheable misaligned read is converted into a cache line fill obviating the second bus cycle of the misaligned read cycle (see, Section 6).

With RD asserted, the BIU knows that when the current bus cycle completes, bus cycle request done can be signaled to the L1 cache. In particular, the RD attribute bit takes care of the situation in which AHOLD is asserted during the first bus cycle of a split bus cycle request such that this first bus cycle completes prior to any cache inquiry—thus, from the standpoint of the L1 cache, AHOLD can result in a cache inquiry before the interrupted current bus cycle request is signaled DONE.

Referring to FIG. 4a, the ADDR/ATTR section 111a of the current cycle register BCC and the next cycle register BNC are loaded from b_addr, while the ADDR/ATTR section 112a of the cache inquiry register BHM is loaded from the local bus 101 through the I/O logic 102. The DATA sections 111b and 112b of BCC and BHM are loaded from b_data.

BCC and BHM stage a single 64-bit qword of write data. For bus cycle requests that require writing multiple qwords, such as data that is qword misaligned or burst mode bus cycles, data is staged in the L1 cache logic (and write buffers) and transferred a qword at a time to the BCC and BHM DATA sections for staging.

3.2. Bus Cycle Requests

For the exemplary microprocessor, all CPU-initiated bus cycle requests are through the L1 cache logic (i.e., all CPU accesses are presented to the L1 cache, which requests an external bus cycle if the access misses or is noncacheable). The BIU interfaces to the microprocessor's L1 cache logic (70 in FIG. 1a) and the write buffers (29 in FIG. 1a) over the buses b_addr, b_cntrl, and b_data.

A bus cycle request may be noncacheable reads or writes, or cacheable transfers—cache line fills, replacements, or snoop write-backs (in response to cache inquiries). All bus cycles requests are staged in the BIU.

Referring to FIG. 3a, for each bus cycle run by the BIU, a 3:1 multiplexer 114 selects address/control from BCC, BNC, or (for snoop write-back cycles) BHM. A 2:1 multiplexer 115 selects corresponding data from BCC or (for snoop write-back cycles) BHM—multiplexer 115 outputs high and low dwords H and L to the corresponding sections of the output data latches 103.

The current cycle register BCC stages address/control, and for writes, data for the current bus cycle request from the L1 cache logic. The BIU will initiate the bus cycle with an address strobe ADS#, driving out address/control from the BCC through the multiplexer 114 (and through the output latches in I/O 102).

A requested bus cycle will be a burst or non-burst cycle depending on: (a) for reads, CACHE#/BLAST# and KEN#, and (b) for writes, whether the request is for a replacement or snoop write-back. For 64-bit systems, a burst address sequence will be generated internally by the BIU, and staged in BCC, but only the first address of the burst is driven out (i.e., the system logic is required to generate the burst sequence). For 64/32 systems, in accordance with the 486 bus protocol, each address of a burst address sequence is staged in BCC and driven out for the corresponding transfer of the burst.

For the exemplary microprocessor in a 64-bit system, a current bus cycle request is staged in BCC by loading ADDR and ATTR—for a write cycle, has_write is clear, and for a read cycle, has_write is asserted. The bus cycle is initiated by driving out ADDR with ADS#—for a write (W/R#=W), in the same clock that ADDR is driven out (a) a qword of data is loaded into the DATA section of BCC, and (b) has_write is switched to asserted (indicating that BCC has staged the qword). For burst writes (replacements and snoop write-backs), each qword of the burst is loaded into BCC and then moved to the data output latch as the next qword is loaded into BCC (has_write remains asserted).

3.3. Pipelined Cycles

For a conventional 586 bus protocol with pipelining, the next cycle register BNC stages address/control for the next pending bus cycle request. Cache line fill cycles and noncacheable cycles may be pipelined, but not replacements or snoop write-backs.

If a bus cycle request is pending, then if the system asserts NA# during the current bus cycle (i.e., before BRDY# is returned), the BIU will initiate a pipelined bus cycle by driving out address/control from BNC—the address/control for the current cycle in BCC remains valid. If the system does not assert NA#, when the current bus cycle terminates with BRDY# (or the last BRDY# of a burst cycle), address/control in BNC is moved to BCC in ph2 of the same clock as BRDY#, allowing the address output latch 102 to be updated and driven in ph1 of the next clock.

The exemplary next cycle register BNC does not include a data section for storing the data associated with a next pending write cycle. For a pipelined write cycle in which the address/control staged in BNC is driven out with NA#, when the current bus cycle terminates with BRDY#, address/control for the pipelined write cycle is moved from BNC to BCC (BNC invalidated) in ph2 of the BRDY# clock—the corresponding data for the pipelined write cycle is loaded from the L1 cache logic (or write buffers) over b_data into the BCC-DATA section 111b in ph2 of the BRDY# clock, allowing the output data latch to be updated and driven in ph1 of the next clock.

For the exemplary microprocessor in a 64-bit system, a next bus cycle request is staged in BNC by loading ADDR/ATTR—for a write cycle, has_write is clear, and for a read cycle, has_write is asserted. For next write cycles, has_write will be switched asserted after ADDR/ATTR is moved from BNC to BCC, and the associated write data is loaded into the DATA section of BCC during the next bus cycle. In accordance with aspects of the invention, the has_write bit in BNC is used in implementing noncacheable misaligned read/writes (see, Section 5).

3.4. Inquiry Cycles

For the conventional 486 and 586 bus protocols, DMA cycles are initiated AHOLD or BOFF#. From the Background, if the system asserts AHOLD, the current bus cycle is completed while the DMA device drives the cache inquiry address into the BIU while asserting EADS#. If the system asserts BOFF#, the current bus cycle is aborted for the cache inquiry cycle.

In the case of either BOFF# or AHOLD, when EADS# is sampled active, the inquiry cycle register BHM is loaded with the cache inquiry address from the local bus 101 through the I/O logic 102. BHM control is static.

In 64-bit mode, a cache inquiry is performed by: (a) presenting the inquiry address to the L1 cache logic for a cache look-up, and (b) for BOFF# or AHOLD, comparing the cache inquiry address to valid addresses in the current cycle register BCC and BNC (for AHOLD, even though the current bus cycle is allowed to complete before a snoop write-back is run, a cache inquiry can hit in either BCC or BNC depending on the timing between EADS# and BRDY#). The BNC register will only be valid for pipelined bus cycles (i.e., BNC will be invalid if the current or next bus cycle is a locked, replacement, or snoop write-back cycle).

For cache inquiries during replacements, if the cache inquiry hits in either the cache, or the BCC/BNC registers, the corresponding MESI bits are checked to determine if that address contains modified (dirty) data (the BCC/BNC attribute field includes the MESI bits), requiring HITM# to be asserted for a snoop write-back cycle. For cache inquiries during fills, the cache inquiry will not cause a snoop write-back cycle, but may result in HIT# being asserted.

If the cache inquiry hits on modified data, HITM# will be asserted by the bus interface controller 106, and the microprocessor will run a snoop write-back cycle to update system memory prior to the DMA access. A snoop write-back cycle is run with the cache inquiry address stored in the ADDR/ATTR section 112a of BHM by the cache inquiry, and the corresponding data in the DATA section 112b of BHM from the L1 cache over b_data. That is, BHM-DATA is always loaded from the L1 cache because, even in a case where a BOFF# inquiry hits in BCC, at the time of the BOFF#, the first 64-bit qword of data may have already been transferred, and no longer in BCC-DATA.

In accordance with aspects of the invention, for a 64/32 system, if a BOFF# inquiry interrupts a cache line replacement staged in the BIU, the cache inquiry address is also compared to the BNC register (see, Section 5).

The BIU includes address comparators 118 and 119 that enable a cache inquiry comparison for the current cycle register BCC and, in accordance with aspects of the invention, the next cycle register BNC. Thus, the BIU can compare the cache inquiry address from the inquiry cycle register BHM with either or both BCC and BNC. If the cache inquiry hits in BCC, BNC, or the L1 cache, the data for the snoop write-back cycle is loaded into the BHM DATA section from the L1 cache logic over b_data.

4. Replacement/Snoop Write-Back

For a 64/32 system, the exemplary 64-bit microprocessor design includes bus interface and protocol logic to implement replacement cycle requests involving both sectors of a cache line as split replacement cycles—sector reordering is performed if the first bus cycle is interrupted by an intervening BOFF# write-back cycle. In accordance with aspects of the invention, the exemplary BIU uses the next (pipeline) cycle register BNC to stage the second write cycle of a split replacement cycle request, and to implement combined replacement/snoop write-back cycles with sector reordering.

Referring to FIGS. 3a and 4a, for the exemplary sectored L1 cache, a cache line replacement requires writing back those sectors of the cache line that contain modified data—S0 and/or S1—as determined by testing the MESI bits for each sector. Recall that for S0, address bit A4 is 0, and for S1, address bit A4 is 1.

The exemplary procedure for implementing combined replacement/snoop write-back cycles with sector reordering is used in cases where a replacement cycle request involves a cache line in which both sectors contain modified (dirty) data, such that the BIU splits the replacement cycle request into a split replacement cycle with two separate burst write cycles, first writing back sector S0, and then Sector S1. Thus, this description assumes that both sectors of a cache line replacement must be staged in the BIU for write back.

4.1. BNC Staging

In accordance with aspects of the invention, the BIU stages the split replacement cycle request such that sector S0 staged in the current cycle register BCC, and sector S1 is staged in the next (pipeline) cycle register BNC. When implementing split replacement cycle requests, sector reordering is required in the following scenario: (a) the L1 cache logic requests a cache line replacement cycle (sectors S0 and S1), and the BIU determines from the MESI bits which sectors contain modified data, (b) assuming both S0 and S1 are modified, the BIU stages S0 in BCC and S1 in BNC, (c) BOFF# is asserted during the S0 burst cycle, which is aborted, and (d) the cache inquiry cycle hits on S1 staged in BNC. In this scenario, the snoop write-back cycle must be run, and then the replacement cycle restarted.

Staging the second write cycle in BNC has a number of advantages, including avoiding having to make the comparators used for the cache inquiry of BCC and BNC (FIG. 4a, 118 and 119) different, and to include logic to loop for split cycles.

4.2. Protocol

In general, according to the exemplary combined replacement/snoop write-back cycle procedure where BOFF# is asserted during the S0 bus cycles, sector reordering is implemented as follows: (a) in response to a cache inquiry hit on S1, S1 from BNC is moved to BHM for the snoop write-back cycle, (b) BNC is invalidated, (c) the BIU reruns the S0 replacement burst cycle, (d) signaling DONE to the L1 cache logic when this bus cycle completes. Thus, the normal replacement cycle order of S0/S1 is reordered to S1/S0 due to the intervening BOFF# write-back of S1.

Figure 5:
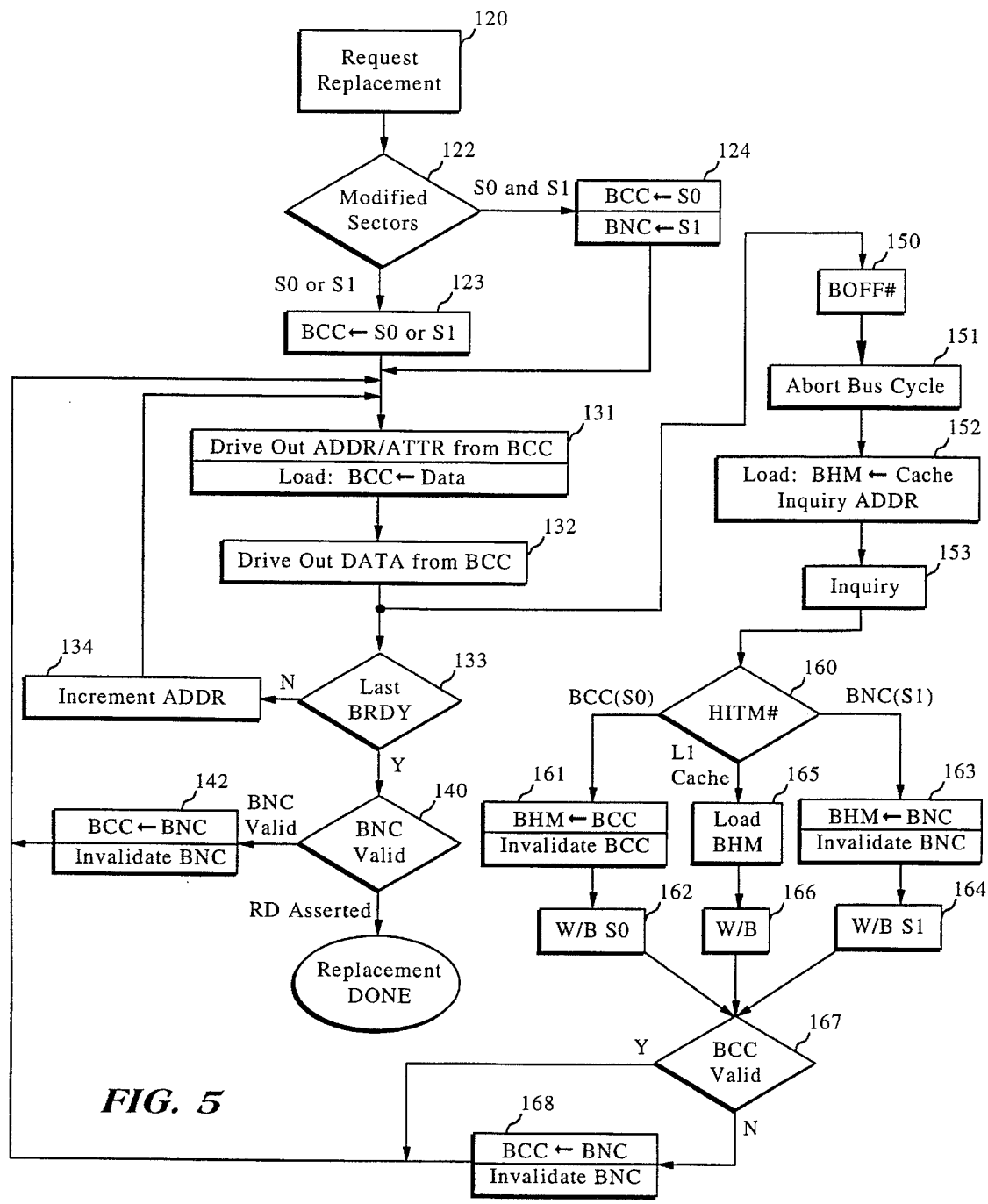
FIG. 5 is a flow chart illustrating, for a 32-bit bus architecture, using the pipeline cycle BNC register in accordance with aspects of the invention to stage a split replacement cycle involving both sectors of a cache line, including implementing sector reordering if the replacement cycle is interrupted by a BOFF# write-back cycle.

FIG. 5 is a flow chart illustrating the exemplary procedure for combined replacement/snoop write-back cycles with sector reordering using the next (pipeline) cycle BNC register to stage the second bus cycle in accordance with aspects of the invention.

Referring also to FIGS. 3a and 3b, the cache line replacement cycle is requested (120) by providing the cache line address and associated sector S0/S1 MESI bits to the BIU. The BIU determines (122) whether one or both sectors of the cache line contain modified (dirty) data: (a) if only S0 or S1 is modified, address/attributes for the modified sector are loaded (123) into BCC (BCC valid), while (b) if S0 and S1 are modified, the BIU stages a split replacement cycle.

For the split replacement cycle request, address/attributes for S0 are loaded into BCC (123), while address/attributes for S1 are loaded (124) into BNC—both BCC and BNC are marked valid, and the RD attribute bit in BCC cleared (indicating a split replacement cycle). That is, the address for S0 (which is the cache line address) is loaded into BCC, and that address with address bit A4 forced to a 1 is loaded into BNC.

A replacement cycle is initiated as a burst mode transfer of S0 by driving out (131) address/control for the first dword D0 of S0. At the same time, the first qword (64 bits) of data (D0/D1) is loaded from the L1 cache into the DATA section 111b of BCC (ph2) and the output data latches 103 (ph1 of the next clock)—the low dword D0 is driven out of the output data latches and multiplexed onto the 32-bit local bus by multiplexer 104.

The replacement burst cycle proceeds with the system returning BRDY# after each dword transfer—the BIU determines (133) whether each BRDY# is the last BRDY# of the burst, and if not, increments (134) the address. In the second bus cycle of the burst, the high dword D1 of the first qword Q0 is driven out of the output data latches 103—for the third and fourth bus cycles, the second qword Q1 of sector S0 is loaded into BCC-DATA and the output data latches, and the low and high dwords D0 and D1 of Q1 are multiplexed out in successive bus cycles, completing the replacement burst cycle for sector S0.

Absent BOFF#, the S0 burst cycle completes with the last BRDY# (133). The BIU then runs the second write cycle of the split replacement cycle.

Specifically, the BIU detects BNC valid (140), and moves (142) S1 address/attributes from BNC to BCC (invalidating BNC) in preparation for the S1 burst cycle (131, 132, 133, 134). DONE is not signaled to the L1 cache logic after the S0 burst cycle because RD in BCC is clear—transferring BNC to BCC switches RD to asserted, such that the BIU signals done after the S1 burst write cycle.

If, BOFF# is asserted (150) during the S0 write cycle (131, 132, 133, 134), then in accordance with the exemplary procedure for combined replacement/snoop write-back cycles, sector reordering is required. The BIU aborts (151) the current S0 write cycle, and implements a cache inquiry cycle.

With EADS#, an inquiry address is driven (152) into BHM by the DMA device. A cache inquiry is performed (153) in which (a) the BIU compares the inquiry address to the S0/S1 addresses in BCC and BNC (both valid), and (b) the L1 cache logic performs a cache look-up. HITM# is signaled (160) if the cache inquiry hits in the BIU (BCC or BNC), or the cache, to notify the system logic that a snoop write-back cycle is required before the DMA access.

If the cache inquiry hits in BCC, address/attributes for S0 is moved (161) to BHM (BCC invalidated), and a snoop write-back cycle for S0 is run (162), with S0 data being reloaded into the DATA section of BHM from the L1 cache logic. If the cache inquiry hits in BNC, the address/attributes for S1 is moved (163) to BHM (BNC invalidated), and a snoop write-back cycle for S1 run (164), with the S1 data being loaded into the DATA section of BHM from the L1 cache. If the cache inquiry hits in the L1 cache, BCC and BNC are unaffected, and BHM is loaded from the L1 cache (165) for the snoop write back cycle (166).

Note that, in the case of a cache inquiry hit in BCC, the S0 data is reloaded from the L1 cache rather than being moved from the DATA section of BCC. If BOFF# is asserted after the second dword is written out (i.e., after the second BRDY#), the two dwords of the first qword Q0 will have been driven out, and the second qword Q1 with the third and fourth dwords will have been loaded into BCC-DATA (and the output data latch). Thus, Q0 will no longer be available in BCC-DATA DATA for transfer to BHM-DATA.

When the snoop write back cycle is complete, the BIU restarts the replacement bus cycle, testing BCC (167) to determine if it is valid.

In accordance with the exemplary procedure for sector reordering during combined replacement/snoop write-back cycles, if the cache inquiry hits on S1 in BNC, the BIU runs a snoop write-back cycle for S1 (163), invalidates BNC, and switches the RD attribute bit in BCC to asserted. Restarting the replacement bus cycle will result in a burst mode transfer of sector S0 (131, 132, 133, 134). When the S0 burst cycle is complete, BNC tests invalid and RD tests asserted (140), and DONE will be signaled to the L1 cache logic because BCC-RD is asserted.

As a result, the split replacement cycle request is completed, although, in accordance with this aspect of the invention, the sectors of the cache line are written back in reverse S1/S0 order due to the intervening BOFF# writeback of sector S1, thereby obviating writing back S1 as the second burst cycle of a split replacement cycle request.

By comparison, if BCC is not valid, meaning that the cache inquiry hit in BCC and S0 has already been written back in the snoop write-back cycle, the address/attributes for S1 in BNC are moved to BCC (168), and BNC is invalidated and the RD attribute bit in BCC is switched asserted. Restarting the replacement bus cycle will result in a burst mode transfer of sector S1 (131, 132, 133, 134)—this will complete the replacement cycle, i.e., BNC will test invalid and RD will test asserted (140), and the BIU will signal DONE.

Note, that if BOFF# is asserted during the second replacement cycle for S1 (S0 previously written back, BNC invalid), and the cache inquiry hits on BCC such that an S1 snoop write back cycle is run, BCC will test invalid with RD asserted, and the BIU will signal DONE.

5. Misaligned Reads/Writes

For a 64/32 system, the exemplary 64-bit microprocessor design includes bus interface and protocol logic to implement split noncacheable reads and writes where the data (words or dwords) are dword misaligned but qword aligned. In accordance with aspects of the invention, the exemplary BIU uses the next (pipeline) cycle register BNC (including the has_write attribute bit) to stage the second bus cycle of a split noncacheable misaligned read/write cycle request.

Referring to FIG. 3b, a qword Q0 includes aligned dwords D0 and D1. A misaligned dword DM includes byte 3 of D0 and bytes 4–6 of D1. The description in this section will focus on misaligned dwords such as DM—the same description would apply to misaligned words such as a word formed by bytes 3 and 4.

For noncacheable read/write cycle requests, BLAST# is asserted (and KEN# is ignored). Typically, noncacheable reads are locked reads (read-modify-write), while noncacheable writes are writes that miss in the cache (where the L1 cache uses a no-write allocation policy in which a write miss does not result in a cache line fill).

The exemplary procedure for implementing noncacheable misaligned reads/writes is used in cases where the addressed dword DM is misaligned within an aligned qword Q0, such that the BIU splits the read/write cycle request for DM into two separate bus cycles, first transferring dword D0, and then dword D1. Thus, this description assumes that the read/write bus cycle request is (a) noncacheable, and (b) for a misaligned dword DM that is aligned within qword Q0—the same description would apply to a misaligned word.

5.1. BNC Staging

In accordance with aspects of the invention, the BIU stages the split read/write cycle request such that dword D0 is staged in the current cycle register BCC (RD bit clear), and dword D1 staged in the next (pipeline) cycle register BNC. The has_write attribute bit in BNC is used to indicate that, for write cycles, the data for D1 has been loaded into the DATA section of BCC with the loading of the qword Q0 containing dwords D0 and D1.

Staging the second read/write cycle for D1 in BNC has a number of advantages, including taking advantage of logic used in 64/32 mode for split replacement cycles. Using the has_write attribute bit to indicate that the associated data has been loaded into BCC-DATA has a number of advantages, including inhibiting the BIU from accessing the L1 cache over the internal data bus when BNC is transferred to BCC for the second bus cycle.

5.2. Protocol

In general, according to the exemplary procedure for noncacheable misaligned reads/writes, the BIU runs the split read/write cycle request as follows: (a) the L1 cache logic requests a read/write for a dword that is dword misaligned but qword aligned, and signals misalignment based on bytes 3 and 4 of the qword being both valid, (b) the BIU stages Q0/D0 in BCC (has_write asserted for read and clear for write, and RD clear), and stages D1 (A2 forced to 1) in BNC (has_write asserted for read or write), (c) the BIU runs the D0 bus cycle, and for writes, loads data into BCC-DATA (has_write is asserted), (d) BNC is moved to BCC (with has_write attribute already asserted, and RD set), and (e) the BIU runs D1 bus cycle. As a result, the misaligned dword DM is transferred.

Figure 6:
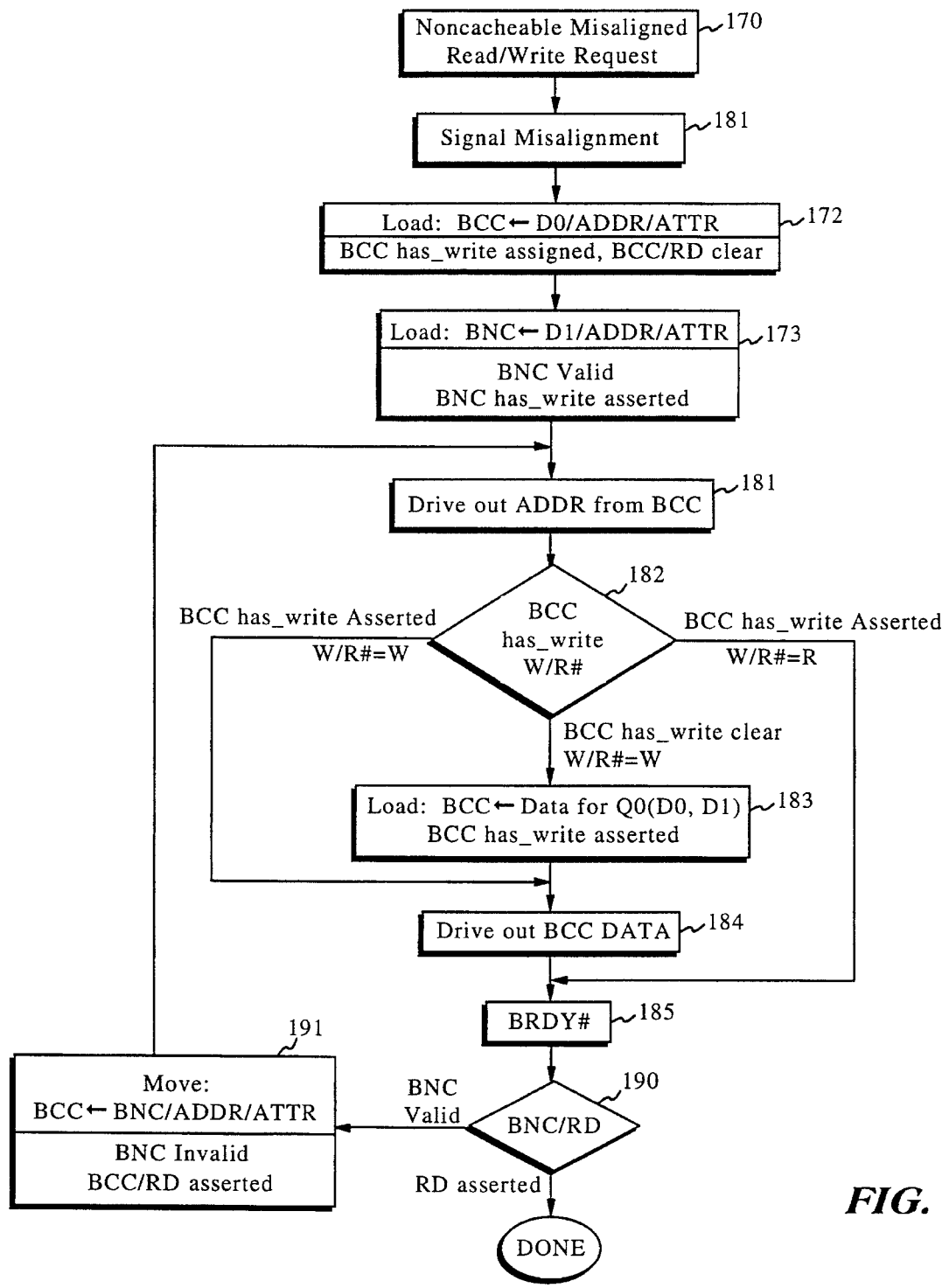
FIG. 6 is a flow chart illustrating, for a 32-bit bus architecture, using the pipeline cycle BNC register in accordance with aspects of the invention to stage a split noncacheable read/write cycles for misaligned dwords that are qword aligned.
Figure 7:
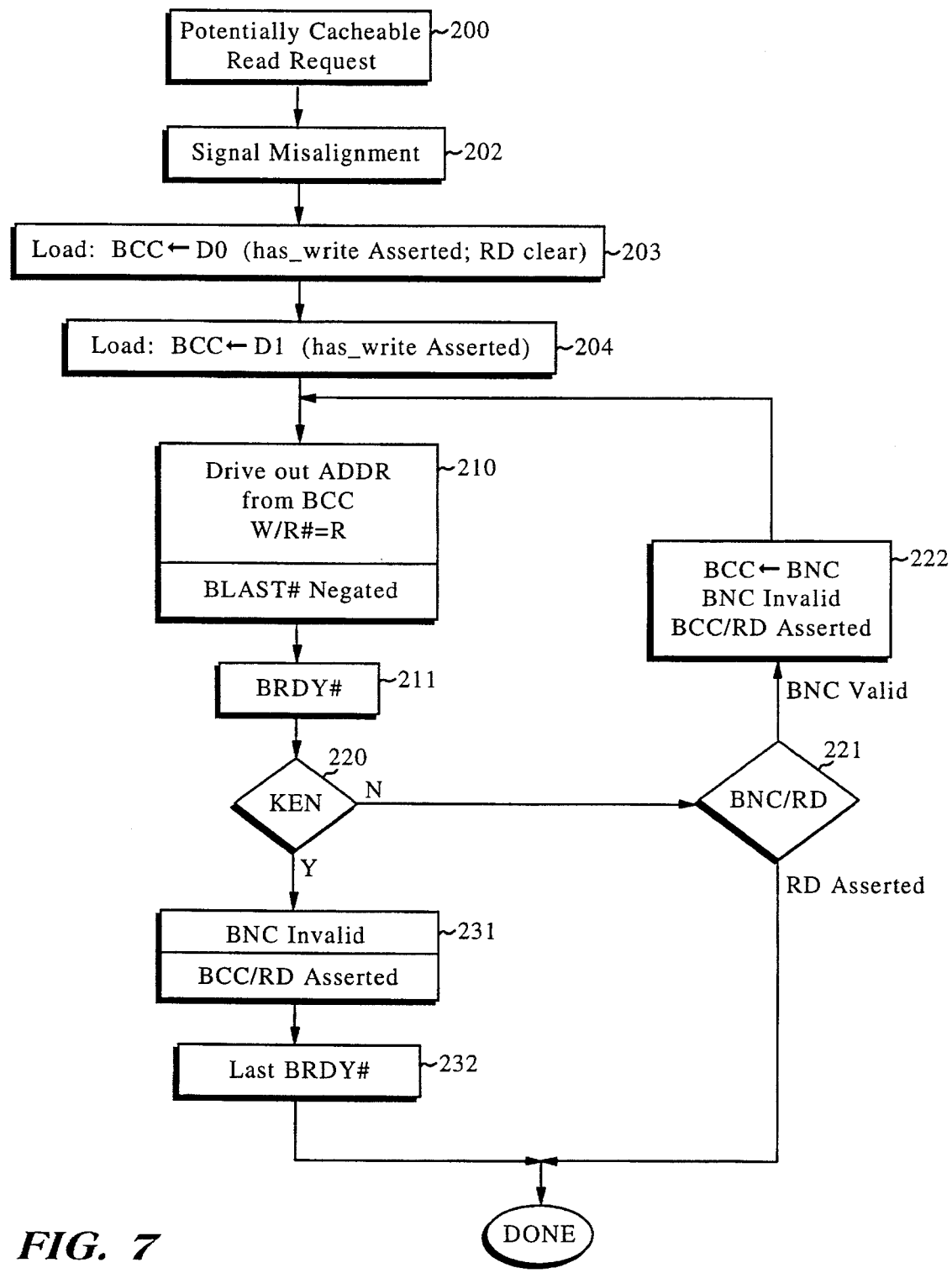
FIG. 7 is a flow chart illustrating, for a 32-bit bus architecture, using the pipeline cycle BNC register in accordance with aspects of the invention to stage a split potentially cacheable read cycles for misaligned dwords that are qword aligned (including invalidating the second bus cycle if the first bus cycle is converted into a burst fill cycle).

FIG. 6 is a flow chart illustrating the exemplary procedure for requests for noncacheable misaligned read/write cycles.

The L1 cache logic requests (170) a noncacheable read/write bus cycle for a dword by sending the BIU a qword address Q0 A[31-3] (and address bit A[2]) along with associated byte enables BE[7:0] (the byte enables designate a misaligned dword such as DM in FIG. 3b). At the same time, the exemplary L1 cache logic detects (171) that the dword DM includes bytes 3 and 4 of the qword, and signals misalignment (171) to the BIU.

In response to the misalignment signal from the L1 cache logic, the BIU stages the read/write bus cycle request for the misaligned dword DM as a split request for both dwords D0/D1 of the qword Q0. Address/attributes for dword D0 (Q0) are loaded (172) into BCC, with the has_write attribute bit set (clear for write, asserted read) and the RD attribute bit clear. Address/attributes for dword D1 (D0 address with A2 forced to 1) are loaded (173) into BNC, with the has_write attribute bit asserted (read or write).

The BIU then executes the split read/write cycle request as two separate dword bus cycles for D0 and D1. Address/control for D0 is driven out (181) from BCC. Based on the state of BCC has_write (182), and the W/R# bus cycle control signal, the BIU detects (182) whether the bus cycle request is a read or a write in which the write data is not yet loaded into the DATA section of BCC.

In the case of a write cycle request, in the same clock that address/control for D0 are driven out from BCC, the BIU loads (183) from the L1 cache the associated qword Q0 (D0 and D1) of write data into BCC-DATA (ph2), and updates the data output latches (ph1 of the next clock)—the low dword D0 is multiplexed out (184) onto the local bus in the first bus cycle of the split request. In the case of a read cycle request, the read data transferred is latched in the input data latches with the return of BRDY# from the system.

In response to BRDY# for D0, completing the first bus cycle of the split read/write request, the BIU tests (190) BCC RD and BNC VALID. If BNC is VALID (RD will be clear), then address/attributes for D1, including the has_write attribute bit asserted, are moved (191) to BCC, and BCC RD is asserted (BNC is INVALID).

The BIU then runs the second bus cycle of the split read/write cycle request. Address/control for D1 are driven out (181) from BCC. In the case of a write cycle cycle (W/R#=W), the BIU detects that BCC has_write (from BNC) is asserted, such that the BIU does not attempt to access the L1 cache for the write data, but rather multiplexes the high dword D1 out of the data output latches.

BRDY# completes the second bus cycle, and the BIU detects BCC RD asserted, and signals DONE to the L1 cache logic.

6. Potentially Cacheable Reads

For a 64/32 system, the exemplary 64-bit microprocessor design includes bus interface and protocol logic to implement split potentially cacheable reads where the data (words or dwords) are dword misaligned but qword aligned. In accordance with aspects of the invention, the exemplary BIU uses the next (pipeline) cycle register BNC (including the has_write attribute bit) to stage the second bus cycle of a split potentially cacheable misaligned read cycle request— if the first bus cycle is converted into a burst fill cycle, the BIU invalidates the second bus cycle staged in BNC.

Referring to FIG. 3b, a qword Q0 includes aligned dwords D0 and D1. A misaligned dword DM includes byte 3 of D0 and bytes 4–6 of D1. The description in this section will focus on misaligned dwords such as DM—the same description would apply to misaligned words such as a word formed by bytes 3 and 4.

For potentially cacheable reads that miss in the cache, the microprocessor initiates a fill cycle request by providing a dword address (address bits A[31-2] and the byte enables BE[7:0]). The BIU runs a read cycle to transfer the addressed data, negating BLAST# to identify the read cycle as potentially cacheable. If the system logic returns KEN#, the BIU will convert the read cycle into a burst mode fill cycle.

The exemplary procedure for implementing potentially cacheable misaligned reads is used in cases where the addressed dword DM is misaligned within the an aligned qword Q0, such that the BIU splits the potentially cacheable read cycle request for DM into two separate bus cycles, first transferring dword D0, and then dword D1. Thus, this description assumes that the read bus cycle request is (a) potentially cacheable, and (b) for a misaligned dword DM that is aligned within qword Q0—the same description would apply to a misaligned word.

6.1. BNC Staging

In accordance with aspects of the invention, the BIU stages the split read cycle request such that dword D0 is staged in the current cycle register BCC (RD bit clear), and dword D1 staged in the next (pipeline) cycle register BNC. The has_write attribute bits in both BCC and BNC are asserted, indicating a read (W/R#=R).

Staging the second read cycle for D1 in BNC has a number of advantages, including taking advantage of logic used in 64/32 mode for split replacement cycles, and implementing potentially cacheable misaligned reads is the same manner as noncacheable misaligned reads with the addition of a small amount of logic to invalidate BNC if the read is cacheable.

6.2. Protocol

In general, according to the exemplary procedure for potentially cacheable misaligned reads, the BIU runs the split read cycle request as follows: (a) the L1 cache logic requests a potentially cacheable read for a dword that is dword misaligned but qword aligned, and signals misalignment based on bytes 3 and 4 of the qword being both valid, (b) the BIU stages Q0/D0 in BCC (has_write asserted for read, and RD clear), and stages D1 (A2 forced to 1) in BNC (has_write asserted for read), (c) the BIU runs the D0 bus cycle, negating BLAST #, and (d) if the system logic returns BRDY# without asserting KEN#, the BIU runs the second read cycle of the split read, moving BNC to BCC (asserting BCC RD) and driving out address/control for the high order dword D1, or (e) if the system logic returns BRDY# and KEN#, and the BIU responds by converting the read cycle to a cache fill cycle, invalidating BNC and asserting BCC RD (recognizing that the high order dword D1 will be transferred as part of the burst fill cycle). As a result, the misaligned dword DM is transferred either in a split read cycle, or a sector fill cycle.

FIG. 8 is a flow chart illustrating the exemplary procedure for implementing split cycle requests for potentially cacheable reads.

The L1 cache logic requests (200) a read cycle by sending the BIU a qword address Q0 A[31-3] (and address bit A[2]) along with associated byte enables BE[7:0] (the byte enables designate a misaligned dword such as DM in FIG. 3b). At the same time, the L1 cache logic detects that the dword DM includes bytes 3 and 4 of the qword, and signals misalignment (202) to the BIU.

In response to the misalignment signal from the L1 cache logic, the BIU stages the read bus cycle request for the misaligned dword DM as a split request for both dwords D0/D1 of the qword Q0. Address/attributes for dword D0 (Q0) are loaded (203) into BCC, with the has_write attribute bit asserted (read) and the RD attribute bit clear. Address/attributes for dword D1 (D0 address with A2 forced to 1) are loaded (204) in to BNC, with the has_write attribute bit asserted (read).

With the read cycle request staged as a split read cycle, the BIU runs the first read cycle for D0. Address/control for D0 is driven out (210) from BCC, with W/R#=R and BLAST# negated. The read data transferred is latched in the input data latches with the return of BRDY# from the system.

When BRDY# for D0 is sampled active (211), the microprocessor also samples (220) the state of KEN# from the previous clock.

If KEN# is not asserted, the BIU completes the split read cycle to transfer the second dword D1 (i.e., the BIU executes a noncacheable misaligned read). The BIU tests (221) BCC RD and BNC validity—if BNC is VALID (RD will be clear), then address/attributes for D1, including the has_write attribute bit asserted, are moved (222) to BCC, and BCC RD is asserted (BNC is INVALID).

The BIU then runs the second bus cycle of the split read cycle request. Address/control for D1 are driven out (210) from BCC, with W/R#=R and BLAST# negated.

BRDY# (211) completes the second read cycle of the split read cycle request. Again, the state of KEN# is sampled one clock prior to BRDY#, and if not asserted, the BIU detects (221) BCC RD asserted (BNC invalid), and signals DONE to the L1 cache logic.

On the other hand, if after the D0 bus cycle, KEN# is sampled asserted, the BIU converts the split read cycle into a burst mode fill cycle to transfer the associated sector containing both D0 and D1. In particular, after sampling KEN# active, the BIU invalidates BNC (231), and asserts BCC RD.

When the last BRDY# is received, the BIU signals DONE to the L1 cache logic, indicating that the fill cycle is complete, and the sector containing the addressed dword DM is written into the cache.

3. Conclusion

Although the Detailed Description of the invention has been directed to certain exemplary embodiments, various modifications of these embodiments, as well as alternative embodiments, will be suggested to those skilled in the art.

For example, specific register structures, mappings, bit assignments, signal nomenclature, and other implementation details are set forth solely for purposes of providing a detailed description of the invention.

Also, references to dividing data into bytes, words, double words (dwords), quad words (qwords), etc., when used in the claims, are not intended to be limiting as to the size, but rather, are intended to serve as generic terms for blocks of data. Use of the phrase read/write in connection with a bus cycle means that the bus cycle may be either a read or write bus cycle.

Moreover, various modifications based on trade-offs between hardware and software logic will be apparent to those skilled in the art.

The invention encompasses any modifications or alternative embodiments that fall within the scope of the claims.

I claim:

1. A 64/32 computer system including a 64-bit x86 microprocessor, system logic, and system memory, intercoupled by a 32-bit x86 bus architecture which does not support pipelined bus cycles, the microprocessor including an internal L1 cache with two sectors per cache line such that a cache line replacement request involving both sectors is performed as a split replacement cycle with a separate burst write cycle for each sector, the computer system comprising:

(a) a bus interface unit (BIU) in the microprocessor interfaced to the 32-bit bus architecture to implement bus cycles in response to bus cycle requests, the BIU being adaptable to interface to a 64-bit bus architecture that supports pipelined bus cycles;

(b) the BIU includes (i) BCC logic for staging a current bus cycle, and (ii) BNC logic for staging a pipelined bus cycle in applications with a 64 bit bus architecture; and (c) in response to a cache line replacement request in which both sectors of a cache line will be written back to the system memory, the BIU implements a split replacement cycle by (i) staging a first sector in the BCC logic, and staging a second sector in the BNC logic, and (ii) running a first burst write cycle to transfer the first sector staged in the BCC logic, and then running a second burst write cycle to transfer the second sector staged in the BNC logic.

2. The computer system of claim 1, wherein:

(a) the BCC logic includes a BCC register that stores bus cycle address and attributes including a valid indication; and (b) the BNC logic includes a BNC register that stores bus cycle address and attributes including a valid indication;

(c) for the split replacement cycle, the BIU (i) stores address and attributes for the first sector in the BCC register, designating that register as valid, and (ii) stores address and attributes for the second sector in the BNC register, designating that register as valid; and (d) the BIU runs the split replacement cycle by (i) running the first burst write cycle to transfer the first sector staged in the BCC register, (ii) transferring the address and attributes for the second sector from the BNC register to the BCC register, and designating the BNC register as invalid, and then (iii) running the second burst write cycle to transfer the second sector staged in the BCC register.

3. The computer system of claim 2, wherein:

(a) the BCC register stores a request done attribute that, when asserted, indicates that when the current bus cycle completes, the BIU can signal that an associated bus cycle request is done;

(b) when the BIU stages a split replacement cycle, the request done attribute is cleared when address and attributes for the first sector are stored in the BCC register; and (c) after the first burst write cycle transfers the first sector, and address and attributes for the second sector are transferred to the BCC register, then the request done attribute is asserted.

4. The computer system of claim 1, wherein the system logic includes DMA (direct memory access) logic that signals BOFF# to the microprocessor prior to a DMA access to system memory, thereby causing the microprocessor to (i) abort a current bus cycle, (ii) perform a cache inquiry cycle and including, if necessary, running a snoop write-back cycle, and then (iii) restart the aborted current bus cycle, and wherein:

(a) if BOFF# is asserted during the first burst write cycle of the split replacement cycle, and (b) if the cache inquiry hits on the second sector staged in the BNC logic for the second burst write cycle of the split replacement cycle, such that a snoop write-back cycle is run to transfer such second sector, then (c) after the snoop write-back cycle, the BIU restarts the first burst write cycle to transfer the first sector staged in the BCC logic, and (d) after the burst write cycle transferring the first sector is complete, the BIU signals that the cache line replacement request is done.

5. The computer system of claim 4, wherein (a) the BCC logic includes a BCC register that stores bus cycle address and attributes including a valid indication; and (b) the BNC logic includes a BNC register that stores bus cycle address and attributes including a valid indication;

(c) for the split replacement cycle, the BIU (i) stores address and attributes for the first sector in the BCC register, designating that register as valid, and (ii) stores address and attributes for the second sector in the BNC register, designating that register as valid; and (d) after the snoop write-back cycle transfers the second sector staged in the BNC register, the BIU (i) designates the BNC register as invalid, and then (ii) restarts the first burst write cycle to transfer the first sector staged in the BCC register, designating the BCC register as invalid.

6. The computer system of claim 5, wherein:

(a) the BCC register stores a request done attribute that, when asserted, indicates that when the current bus cycle completes, the BIU can signal that an associated bus cycle request is done;

(b) when the BIU stages a split replacement cycle, the request done attribute is cleared when address and attributes for the first sector are stored in the BCC register; and (c) after the snoop write-back cycle transfers the second sector staged in the BNC register, the BIU (i) designates the BNC register as invalid, and (ii) asserts the request done attribute in the BCC register.

7. The computer system of claim 1, wherein, in response to a cache line replacement request, the BIU implements a split replacement cycle only if both sectors of the cache line contain modified data.

8. A 64-bit x86 microprocessor adapted to be coupled to a 32-bit x86 bus architecture which does not support pipelined bus cycles, the microprocessor including an internal L1 cache with two sectors per cache line such that a cache line replacement request involving both sectors is performed as a split replacement cycle with a separate burst write cycle for each sector, the microprocessor comprising:

(a) bus interface means interfaced to the 32-bit bus architecture for implementing bus cycles in response to bus cycle requests, the bus interface means being adaptable to interface to a 64-bit bus architecture that supports pipelined bus cycles;

(b) the bus interface means includes (i) BCC means for staging a current bus cycle, and (ii) BNC means for staging a pipelined bus cycle in applications with a 64 bit bus architecture; and (c) in response to a cache line replacement request in which both sectors of a cache line will be written back to a system memory, the bus interface means implementing a split replacement cycle by (i) staging a first sector in the BCC means, and staging a second sector in the BNC means, and (ii) running a first burst write cycle to transfer the first sector staged in the BCC means, and then running a second burst write cycle to transfer the second sector staged in the BNC means.

9. The microprocessor of claim 8, wherein:

(a) the BCC means includes a BCC register that stores bus cycle address and attributes including a valid indication; and (b) the BNC means includes a BNC register that stores bus cycle address and attributes including a valid indication;

(c) for the split replacement cycle, the bus interface means (i) stores address and attributes for the first sector in the BCC register, designating that register as valid, and (ii) stores address and attributes for the second sector in the BNC register, designating that register as valid; and (d) the bus interface means runs the split replacement cycle by (i) running the first burst write cycle to transfer the first sector staged in the BCC register, (ii) transferring the address and attributes for the second sector from the BNC register to the BCC register, and designating the BNC register as invalid, and then (iii) running the second burst write cycle to transfer the second sector staged in the BCC register.

10. The microprocessor of claim 9, wherein:

(a) the BCC register stores a request done attribute that, when asserted, indicates that when the current bus cycle completes, the bus interface means can signal that an associated bus cycle request is done;

(b) when the bus interface means stages a split replacement cycle, the request done attribute is cleared when address and attributes for the first sector are stored in the BCC register; and (c) after the first burst write cycle transfers the first sector, and address and attributes for the second sector are transferred to the BCC register, then the request done attribute is asserted.

11. The microprocessor of claim 8, wherein the microprocessor is responsive to system logic including DMA (direct memory access) logic that signals BOFF# to the microprocessor prior to a DMA access to system memory, thereby causing the microprocessor to (i) abort a current bus cycle, (ii) perform a cache inquiry cycle including, if necessary, running a snoop write-back cycle, and then (iii) restart the aborted current bus cycle, and wherein:

(a) if BOFF# is asserted during the first burst write cycle of the split replacement cycle, and (b) if the cache inquiry hits on the second sector staged in the BNC means for the second burst write cycle of the split replacement cycle, such that a snoop write-back cycle is run to transfer such second sector, then (c) after the snoop write-back cycle, the bus interface means restarts the first burst write cycle to transfer the first sector staged in the BCC means, and (d) after the burst write cycle transferring the first sector is complete, the bus interface means signals that the cache line replacement request is done.

12. The microprocessor of claim 11, wherein (a) the BCC means includes a BCC register that stores bus cycle address and attributes including a valid indication; and (b) the BNC means includes a BNC register that stores bus cycle address and attributes including a valid indication;

(c) for the split replacement cycle, the bus interface means (i) stores address and attributes for the first sector in the BCC register, designating that register as valid, and (ii) stores address and attributes for the second sector in the BNC register, designating that register as valid; and (d) after the snoop write-back cycle transfers the second sector staged in the BNC register, the bus interface means (i) designates the BNC register as invalid, and then (ii) restarts the first burst write cycle to transfer the first sector staged in the BCC register, designating the BCC register as invalid.

13. The microprocessor of claim 12, wherein:
   (a) the BCC register stores a request done attribute that, when asserted, indicates that when the current bus cycle completes, the bus interface means can signal that an associated bus cycle request is done;
   (b) when the bus interface means stages a split replacement cycle, the request done attribute is cleared when address and attributes for the first sector are stored in the BCC register; and
   (c) after the snoop write-back cycle transfers the second sector staged in the BNC register, the bus interface means (i) designates the BNC register as invalid, and (ii) asserts the request done attribute in the BCC register.

14. The microprocessor of claim 8, wherein, in response to a cache line replacement request, the bus interface means implements a split replacement cycle only if both sectors of the cache line contain the modified data.

15. A bus protocol method for implementing split replacement cycles in a 64/32 computer system including a 64-bit x86 microprocessor, system logic, and system memory, intercoupled by a 32-bit x86 bus architecture which does not support pipelined bus cycles, the microprocessor including a bus interface unit (BIU) implementing bus cycle in response to bus cycle requests, the BIU being interfaced to the 32-bit bus architecture and being adaptable to interfacing to a 64-bit bus architecture that supports pipelined bus cycles, the BIU including BCC logic for staging a current bus cycle, and BNC logic for staging a pipelined bus cycle in applications with a 64 bit bus architecture, the microprocessor including an internal L1 cache with two sectors per cache line such that a cache line replacement request involving both sectors is performed as a split replacement cycle with a separate burst write cycle for each sector, the bus protocol method comprising the steps:
   (a) in response to a cache line replacement request in which both sectors of a cache line will be written back to a system memory, (i) staging a first sector in the BCC logic, and (ii) staging a second sector in the BNC logic, and
   (b) running a first burst write cycle to transfer the first sector staged in the BCC logic, and then
   (c) running a second burst write cycle to transfer the second sector staged in the BNC logic.

16. The bus protocol method of claim 15, wherein the BCC logic includes a BCC register that stores bus cycle address and attributes including a valid indication, and the BNC logic includes a BNC register that stores bus cycle address and attributes including a valid indication; and
   (a) wherein the step of staging the first sector in the BCC logic is accomplished by storing address and attributes for the first sector in the BCC register, and designating that register as valid, and
   (b) wherein the step of staging the second sector in the BNC logic is accomplished by storing address and attributes for the second sector in the BNC register, and designating that register as valid; and
   (d) wherein the steps of running first and second burst write cycles are accomplished by (i) running the first burst write cycle to transfer the first sector staged in the BCC register, (ii) transferring the address and attributes for the second sector from the BNC register to the BCC register, and designating the BNC register as invalid, and then (iii) running the second burst write cycle to transfer the second sector staged in the BCC register.

17. The bus protocol method of claim 16, wherein the BCC register stores a request done attribute that, when asserted, indicates that when the current bus cycle completes, the BIU can signal that an associated bus cycle request is done; further comprising the steps of:
   (a) when the BIU stages a split replacement cycle, clearing the request done attribute when address and attributes for the first sector are stored in the BCC register; and
   (b) after the first burst write cycle transfers the first sector, and address and attributes for the second sector are transferred to the BCC register, asserting the request done attribute.

18. The bus protocol method of claim 15, wherein the system logic includes DMA (direct memory access) logic that signals BOFF# to the microprocessor prior to a DMA access to system memory, thereby causing the microprocessor to (i) abort a current bus cycle, (ii) perform a cache inquiry cycle including, if necessary, running a snoop write-back cycle, and then (iii) restart the aborted current bus cycle, further comprising the steps:
   (a) asserting BOFF# during the first burst write cycle of the split replacement cycle,
   (b) performing a cache inquiry;
   (c) if the cache inquiry hits on the second sector staged in the BNC logic for the second burst write cycle of the split replacement cycle, running a snoop write-back cycle to transfer such second sector,
   (d) restarting the first burst write cycle to transfer the first sector staged in the BCC logic, and
   (e) after the burst write cycle transferring the first sector is complete, signaling that the cache line replacement request is done.

19. The bus protocol method of claim 18, wherein the BCC logic includes a BCC register that stores bus cycle address and attributes including a valid indication, and the BNC logic includes a BNC register that stores bus cycle address and attributes including a valid indication; and
   (a) wherein the step of staging a first sector in the BCC logic is accomplished by storing address and attributes for the first sector in the BCC register, and designating that register as valid,
   (b) wherein the step of staging a second sector in the BNC logic is accomplished by storing address and attributes for the second sector in the BNC register, and designating that register as valid, and
   (b) wherein the step of running a snoop write-back cycle includes running a burst write cycle to transfer the second sector staged in the BNC logic, and then designating the BNC logic invalid.

20. The bus protocol method of claim 19, wherein the BCC register stores a request done attribute that, when asserted, indicates that when the current bus cycle completes, the BIU can signal that an associated bus cycle request is done, further comprising the steps:
   (a) when the BIU stages a split replacement cycle, clearing the request done attribute when address and attributes for the first sector are stored in the BCC register; and
   (b) after the snoop write-back cycle transfers the second sector staged in BNC and designates the BNC register as invalid, asserting the request done attribute in the BCC register.

* * * * *